United States Patent
Muralidharan

(10) Patent No.: US 11,541,794 B1
(45) Date of Patent: Jan. 3, 2023

(54) ADJUSTING HEADREST BASED ON PREDICTED COLLISION

(71) Applicant: Zoox, Inc., Foster City, CA (US)

(72) Inventor: Nirmal Muralidharan, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 211 days.

(21) Appl. No.: 17/122,271

(22) Filed: Dec. 15, 2020

(51) Int. Cl.
| | | |
|---|---|---|
| B60N 2/888 | (2018.01) | |
| B60N 2/00 | (2006.01) | |
| B60R 21/015 | (2006.01) | |
| B60N 2/829 | (2018.01) | |
| B60R 21/013 | (2006.01) | |
| B60N 2/865 | (2018.01) | |

(52) U.S. Cl.
CPC ............ B60N 2/888 (2018.02); B60N 2/002 (2013.01); B60N 2/829 (2018.02); B60N 2/865 (2018.02); B60R 21/013 (2013.01); B60R 21/01512 (2014.10)

(58) Field of Classification Search
CPC ........ B60N 2/888; B60N 2/829; B60N 2/002; B60N 2/865; B60R 21/01512; B60R 21/013
See application file for complete search history.

(56) References Cited

U.S. PATENT DOCUMENTS

| | | | | |
|---|---|---|---|---|
| 6,820,006 B2* | 11/2004 | Patera | .................... | G08G 5/045 |
| | | | | 701/301 |
| 8,672,399 B2* | 3/2014 | Brunner | ............... | B60N 2/3011 |
| | | | | 297/61 |
| 9,145,078 B2* | 9/2015 | Locke | .................... | B60N 2/829 |

OTHER PUBLICATIONS

"Toyota Develops Advanced Head Restraint to Help Reduce Intensity of Whiplash Injuries," dated Jul. 3, 2007, downloaded Jan. 27, 2021 from https://global.toyota/en/detail/280183#:~:text=The%20Active%20Headrest%20is%20an,reduce%20stress%20on%20the%20neck; 2 pages.

\* cited by examiner

*Primary Examiner* — Gertrude Arthur Jeanglaude
(74) *Attorney, Agent, or Firm* — Lee & Hayes, P.C.

(57) ABSTRACT

A vehicle may receive sensor data captured by a sensor, determine that the sensor data represents an object in the environment, and determine a collision probability associated with a predicted collision between the vehicle and the object. Based at least in part on the collision probability, a position of a headrest of the vehicle may be determined relative to a head of an occupant of the vehicle. The headrest may be adjusted in one or more directions prior to occurrence of the predicted collision to minimize injury to the occupant due to the collision.

20 Claims, 6 Drawing Sheets

ADJUSTING HEADREST BASED ON PREDICTED COLLISION

BACKGROUND

Safety is an important consideration in the design and construction of vehicles. In some instances, vehicles may have systems that help detect potential collisions to alert a driver or, in the case of an autonomous vehicle, attempt to perform actions to avoid the collision or lessen the severity of the collision. Many vehicles also have safety systems, such as airbags and seatbelts designed to prevent or minimize injury to occupants during a collision. However, existing safety systems may not provide adequate protection for certain types of collisions such as collisions in which occupants are rear facing (e.g., facing a direction opposite the direction of collision).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
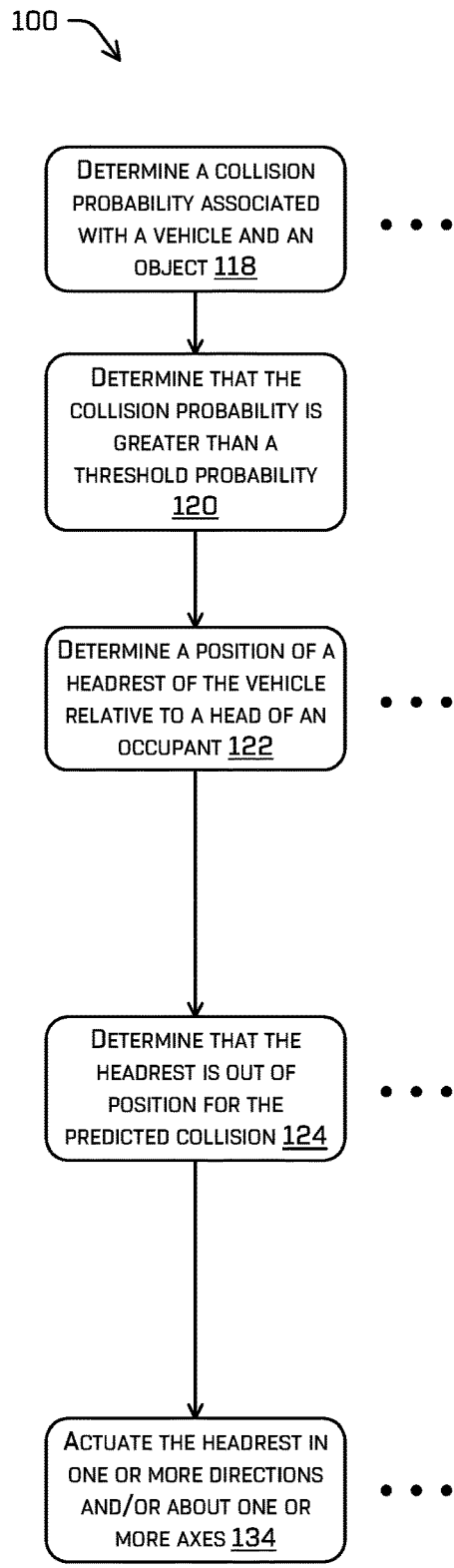
FIG. 1 is a pictorial flow diagram of an example process for determining a collision probability associated with a vehicle and adjusting a headrest of the vehicle.
Figure 1:
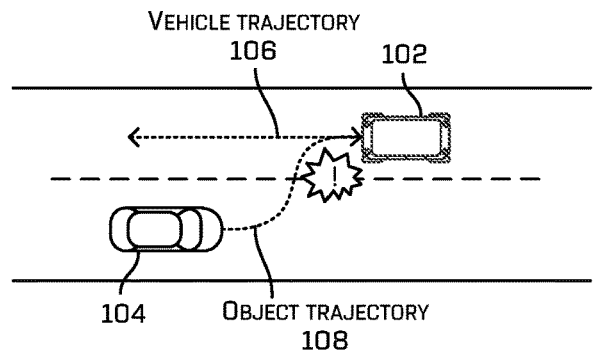
Figure 1:
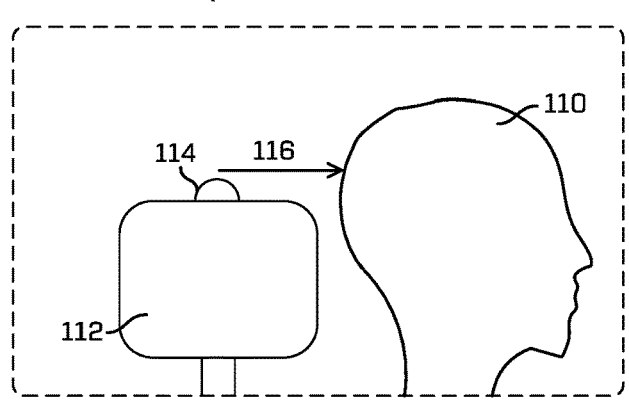
Figure 1:
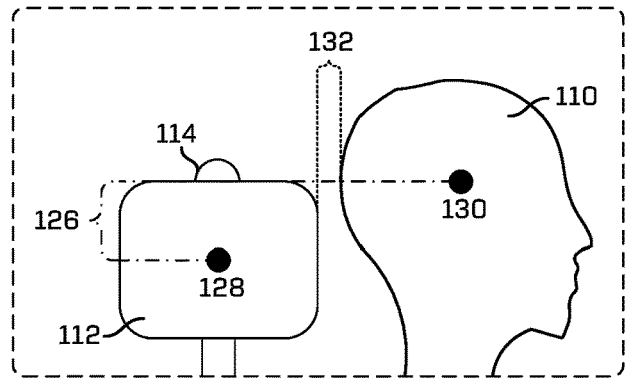
Figure 1:
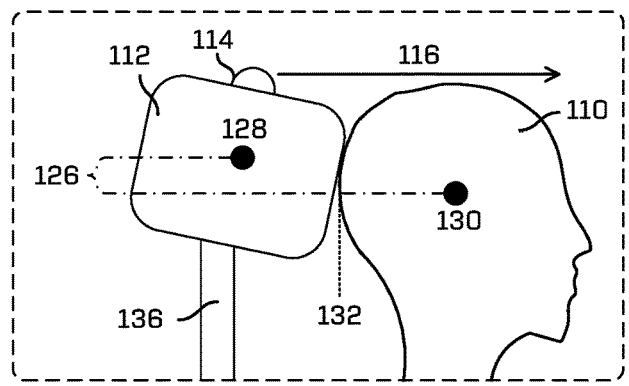

As discussed above, vehicles may have systems that help detect potential collisions to alert a driver or, in the case of an autonomous vehicle, attempt to perform actions to avoid the collision or lessen the severity of the collision. This application describes techniques and systems for adjusting a position of a headrest (or head restraints) before, during, and/or in the event of a collision. In some instances, a vehicle, such as an autonomous vehicle, may predict a potential collision with an object and automatically adjust the position of one or more headrests in advance of the collision. Additionally or alternatively, the vehicle may detect the occurrence of a collision and may adjust the position of one or more headrests during the collision. In some instances, the headrest may be adjusted in one or more directions, such as a vertical direction and/or a horizontal direction. Additionally, an orientation of the headrest may be rotated (e.g., pivot) about one or more axes. Adjusting the headrest may bring the headrest into contact with, or in closer proximity to, a head of an occupant of the vehicle. In the event of a collision, the position of the headrest may limit whiplash or hyperextension of the neck, thereby increasing the safety of the occupants. Also, by contacting the occupant's heads sooner during a collision, the headrest has a greater distance over which to absorb energy of the collision, thereby reducing forces applied to the occupant's head and neck. In some examples, the vehicle may include multiple seating positions and the position and/or orientation a headrest at each seating position may be independently adjusted based on a size and position of an occupant occupying the respective seating position. Thus, each headrest may be adjusted on a per-occupant basis. Additional details of detecting the position of headrests and occupants, as well as adjusting the positions of the headrests, are described further throughout this application.

In some instances, the vehicle may include a safety system that determines a collision probability with one or more objects based on sensor data received by one or more sensors. The sensor data may include data associated with the vehicle and/or one or more objects in the environment of the vehicle. For example, the sensor data may include information associated with physical characteristics, a location, and/or a movement associated with the vehicle and the object(s). Additional information associated with the object(s) may be determined based on the sensor data, such as a position, a velocity, an acceleration, a direction, a size, a shape, a type of the object, etc. Based on the sensor data, the safety system may determine trajectories of the vehicle and/or the object for use in determining the collision probability. Generally, the collision probability may represent a likelihood, or risk, of the collision occurring. In most circumstances, the vehicle can maneuver to safely avoid the collision. However, in instances where avoidance is impossible and the collision probability is greater than a threshold probability, the safety system may determine that a collision is predicted to occur. In some instances, whether the collision is predicted to occur may be based at least in part on determining that the collision is imminent (e.g., within a certain amount of time). Based on this determination, the safety system may communicate with other system(s) of the vehicle for adjusting the position of one or more headrests. In some instances, adjustment of the headrest(s) may be performed prior to a collision (e.g., pre-collision), during a collision, and/or after a collision (e.g., post-collision). In instances where the headrest(s) are adjusted prior to the collision, the safety system may communicate with systems of the vehicle in advance and with enough time to permit adjustment.

Within the vehicle, headrests are provided for occupant comfort and safety. Headrests are also provided to absorb energy upon collision. However, in some instances, improper positioning of the headrest may lead to serious head or neck injury (e.g., hyperextension). For example, if the headrest is positioned too low relative to the head, upon collision, the head may be forced backward and over a top of the headrest. Additionally, if the headrest is horizontally spaced too far away from the head, upon collision, the head may be projected backwards into the headrest with substantial velocities. In either of these instances, adjusting the vertical position, horizontal position, and/or orientation of the headrests relative to the heads of the occupants may increase safety and reduce injuries to occupants of the vehicle.

In some instances, the vehicle may include sensor(s) that indicate whether an occupant is seated within a seat in the vehicle. For example, the seat may include a weight sensor, a sensor may be associated with a seatbelt, a camera, or other sensor for knowing whether the occupant is seated, which of multiple seats the occupant is in, a position of the occupant within the seat, a size of the occupant, and/or other information. Moreover, in some instances, the sensor(s) may be used to determine whether occupant(s) are rearward facing, relative to a direction of travel. In some examples, only those occupant(s) in rearward facing seat(s) may have the headrest adjusted given the risk of hyperextension or whiplash for rearward facing occupant(s), while in some examples headrests for all vehicle occupants may be adjusted. Upon determination that the occupant is seated, the vehicle and/or headrest may include one or more sensor(s) that detect a proximity or position of the head relative to the headrest, vice versa.

In some instances, camera(s) within an interior of the vehicle may be used to determine the location the head of the occupant and/or the headrest and determine a position of the head relative to the headrest, vice versa. In some instances, the camera(s) may be mounted on a ceiling, within the vehicle, and/or on the headrest. Additionally, or alternatively, in some instances, the headrest may include sensor(s) that detect a position of the head relative to the headrest. In some instances, the sensor(s) may be positioned on a top, side(s), front, and/or within the headrest. By way of example, the headrest may include a distance sensor (e.g., infrared (IR) light emitting diode (LED)) positioned on a top surface of the headrest. As the distance sensor emits light, the light may reflect off surfaces and/or objects within the vehicle and the reflected light may be utilized to determine a distance to object(s) (e.g., time-of-flight) and/or whether object(s) are detected. If the reflected signals indicate that no object(s) were detected, or that objects were not detected within a threshold distance (e.g., within 10 centimeters (cm)), this may indicate that the headrest is vertically disposed above the head of the occupant. Comparatively, if object(s) were detected but outside the distance threshold, this may indicate that the headrest is positioned too low relative to the head of the occupant. In either case, a position of the headrest may be adjusted (vertically, horizontally, and/or orientation) until an object is detected within the distance threshold corresponding to a safe position.

In some instances, an optimal position of the headrest may be such that the top of the headrest is aligned, or substantially aligned, with the top of the head of the occupant. To make this determination, the distance sensor may detect the position of the head relative to the headrest and based on this detection, the headrest may be vertically actuated (e.g., upwards or downwards) such that the top of the headrest is aligned, or substantially aligned, with the top of the head of the occupant. As part of this process, the distance sensor may iteratively determine the distance for use in whether to extend the headrest upwards or retract the headrest downward. For example, as the headrest vertically adjusts upward, once the reflection distance starts to increase, the top of the headrest may be determined to be above the top of the head. In some instances, the headrest may be further raised between 2 cm and 3 cm to account for a degree of safety and ensure that the headrest is positioned above the top of the head.

Thus, if the top of the headrest is positioned below the top of the head of the occupant, the headrest may be incrementally raised until the top of the headrest is aligned, or substantially aligned, with the top of the head of the occupant. When the reflected signals are indicative of the headrest being positioned above the head of the occupant (e.g., object(s) are not detected within the threshold distance), the headrest may be said to be aligned, or substantially aligned, with the top of the head of the occupant. However, although the discussion is with regard to the distance sensor being positioned on top of the headrest, the distance sensor may be positioned elsewhere on the headrest (or within the vehicle). For example, the distance sensor may be disposed within the headrest and/or on sides of the headrest. In such instances, the headrest may be raised until the top of the headrest is aligned, or substantially aligned, with the top of the head. This may be accomplish utilizing known dimensions of the headrest and/or dimensions interposed between the distance and the top of the headrest.

In some instances, rather than positioning the headrest relative to the top of the head of the occupant, the headrest may be positioned relative to other portions of the head of the occupant. For example, the headrest may include a central vertical position that aligns, or substantially aligns, with a central vertical position of the head of the occupant. In some instances, aligning the central position of the headrest with the central position of the occupant's head may align the top of the headrest above the top of the head of the occupant. In that case, the top of the headrest may be disposed between zero (0) cm and 10 cm above a central vertical position of the head of the occupant.

In addition to vertically adjusting the headrest, the headrest may also be horizontally adjusted towards the occupant. For example, based at least in part on the reflected signal, the distance disposed between the distance sensor and the back of the head of the occupant may be determined. Based on this distance, the headrest may be advanced in a direction longitudinally towards the occupant. Additionally, or alternatively, the headrest may be rotated about one or more axes for changing an orientation of the headrest. In some instances, rotating the headrest may tilt a front surface of the headrest downward, relative to the occupant. In some instances, the headrest may be tilted between zero (0) degrees and 20 degrees relative to a vertical axis of the headrest. In some examples, the headrest may be tilted between 3 and 4 degrees towards the occupant which may bring the headrest into contact with the back of the head. The headrest may be adjusted vertically, horizontally, and/or rotationally simultaneously, or the adjustments may be performed sequentially (e.g., vertical adjustment, followed by rotational adjustment, followed by horizontal adjustment). Also, while the vertical, horizontal, and rotational adjustments are described as separate adjustments, in some examples an actuator may be configured such that motion of the headrest includes both vertical, horizontal, and/or rotational components of motion.

To adjust the position of the headrest, whether vertically, horizontally, and/or rotationally, the headrest and/or the seat may include one or more actuator(s). The actuator(s) may include electromechanical mechanisms (e.g., motors, gears, screw shafts, etc.), hydraulic mechanisms (e.g., hydraulic pumps, valves, cylinders, etc.), pneumatic mechanisms (e.g., compressors, valves, cylinders, etc.), pyrotechnic mechanisms, or any other mechanisms or combinations of the preceding may be configured to quickly and reliably position the headrest(s) of the vehicle in the event of a collision. For example, the headrest may operably couple to a seat of the vehicle via one or more actuator(s). When actuated, the actuator(s) may extend the headrest farther from or retract the headrest towards the seat. This may adjust the vertical position of the headrest. Additionally, the headrest may include actuators that horizontally position the headrest either toward or away from the head of the occupant. The headrest may additionally or alternatively include one or more additional actuators for rotating or tilting the headrest.

In some instances, the actuator(s) may be controlled by controller(s), module(s), or component(s) disposed within the headrest and/or the seat. Additionally, or alternatively, as noted above, the vehicle may include a safety system that controls actuator(s) to position the headrest. In instances where the safety system is utilized, the safety system may receive sensor data from the distance sensor(s) and/or other sensor(s) of the vehicle for determining the position of the occupant and/or the headrest for use in positioning the headrest relative to the head of the occupant.

Additionally, as adjustment of the headrest may come by way of multiple types or actuators, or multiple forms of actuation, a time associated with the predicted collision may be used for determining how to adjust the headrest. For example, a time associated with the predicted collision may be determined and if the amount of time is over a certain threshold (e.g., the collision is predicted to occur at a certain time in the future), a reversible form of actuation may be implemented to adjust the headrest (e.g., mechanical actuator). However, if the amount of time is under the certain threshold or a collision has already occurred/is in process, an irreversible form of actuation of actuation may be implemented (e.g., pyrotechnics).

In some instances, prior to the predicted collision occurring and/or upon first entering the vehicle, the safety system may determine a safe position of the headrest. For example, upon entering the vehicle, the occupant may be instructed to sit in the seat in an upright or seated position. In some instances, a display within the vehicle may illustrate or present content associated with a proper seating position or a proper position of the head relative to the headrest. Camera(s) within the vehicle, for example, may determine whether the head of the occupant is positioned correctly relative to the headrest, vice versa. Therein, the safety system may determine the position of the headrest in the event of the predicted collision, according to the process described above. In this sense, the safe position of the headrest, or where the headrest is positioned in the event of the predicted collision, may be determined prior to the determination of the predicted collision and saved for use a later instance. In some instances, the safe position may be updated continuously or periodically during the ride in the event the user materially changes position (slouches, leans forward, etc.). In some instances, a safe position can be determined using one or more sensors of a vehicle (e.g., a vision camera, a contact sensor, a capacitance sensor, etc.). The sensor can signal when the headrest is aligned with a head of a user in an optimally safe position In some instances, determining the safe position beforehand (i.e., before a predicted collision) may increase a response time to properly position the headrest in the event of the predicted collision. Moreover, after this initial determination, it is contemplated that the occupant may manually or electronically control the position of the headrest. Despite this adjustment by the occupant, in the event of the predicted collision, the headrest may be positioned according to the safe position previously determined. In some instances, the safe position of the headrest may be determined using known characteristic(s) of the occupant and/or a profile (e.g., account) of the occupant, such as height, weight, head size, etc. For example, a vehicle used for mass transportation may communicate with a mobile device of a user or otherwise identify and store a per-user profile including information pertaining to the safe position of the headrest. In certain instances, the safe position of the headrest may change depending on the seat orientation, seat configuration, characteristics of the occupant (e.g., weight, height, etc.) and/or may be uniquely associated with a specific seating position within a vehicle. For example, a safe headrest position may be different between a rearward-facing occupant, a side-facing occupant, and/or a forward-facing occupant within a vehicle.

In light of the above, the present application may adjust the headrest to mitigate whiplash or other related neck injuries in the event of a collision. The headrest may adjust based on the current position of the headrest, prior to the predicted collision, for accommodating differently sized occupants. The headrest may also adjust in different ways (e.g., vertically, horizontally, rotationally) to align the headrest with a top of the head. In some instances, a sensor of the headrest (e.g., IR LED distance sensor) may operate in unison with one or more actuator(s) to move the headrest in proximity to the occupant upon the occupant being seated and/or upon a determination of the predicted collision. In some instances, the headrest may be adjusted for rearward facing occupant(s) given the dangers of hyperextension. However, although instances are discussed herein with reference to adjusting a headrest, it is to be understood that the vehicle may include multiple seating positions associated with respective headrests, and the position and/or orientation the headrests at each seating position may be independently adjusted based on a size and position of an occupant. As such, each headrest may be adjusted on a per-occupant basis.

In some instances, a difference between a safe headrest position and a current headrest position (e.g., one manually adjusted by a user) can be tracked or otherwise pre-determined prior to detection of a collision event. This may reduce the time necessary to change a position of the headrest between a current position and a safe position if a collision event is determined or expected.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 is a pictorial flow diagram of an example process for determining a collision probability and adjusting a position of a headrest based at least in part on the collision probability and/or a collision occurring. In FIG. 1, an example environment 100 is shown that includes a vehicle 102 and an object 104 traversing the environment 100 (e.g. along a roadway). For example, the vehicle 102 may be traveling on a road and may be moving in a direction that is opposite (e.g., oncoming) to movement of the object 104 traveling on the road.

The vehicle 102 may have a vehicle trajectory 106, while the object 104 may be associated with an object trajectory 108. In some instances, the vehicle 102 may determine the vehicle trajectory 106 and/or the object trajectory 108. For example, the vehicle trajectory 106 and/or the object trajectory 108 may be determined based on sensor data received by one or more sensors on the vehicle 102. Examples of vehicle trajectories and object trajectories are discussed in, for example, U.S. patent application Ser. No. 16/151,607 titled "Trajectory Prediction On Top-Down Scenes," filed Oct. 4, 2018, which is incorporated by reference herein in its entirety, and in, for example, U.S. patent application Ser. No. 15/843,512 titled "Trajectory Generation Using Curvature Segments," filed Dec. 15, 2017, which is incorporated by reference herein in its entirety. In some instances, sensor data may be obtained from teleoperations, other vehicles, sensors in the environment, and so forth.

The vehicle 102 may include an occupant 110 (e.g., passenger) seated within a seat inside the vehicle 102. The seat may include, or couple to, a headrest 112. Generally, the headrest 112 may represent a padded member or support that extends from the seat and which is designed to support the head of the occupant 110. During transportation, the headrest 112 may provide the occupant 110 comfort (e.g., allow the occupant 110 to rest their head during travel). Additionally, in the event of a collision, the headrest 112 may absorb energy associated with the collision. As shown, the occupant 110 may be rearward facing relative to a direction of travel of the vehicle 102. In this sense, the headrest 112 may be located in front of the occupant 110, relative to the direction of travel. In some instances, the headrest 112 may have a height between at least 15 cm to 35 cm. The headrest 112 may be manufactured from materials that provide comfort to the occupant 110 and absorb forces (i.e., energy) during collisions. Additionally, the headrest 112 may deform plastically (e.g., crush) to absorb energy during the collision. For example, the headrest 112 may include materials or compositions described in U.S. patent application Ser. No. 16/917,079 titled "Seat Back Energy Absorber," which is incorporated by reference herein in its entirety.

The headrest 112 is shown including a sensor 114 that generates or captures data for use in determining whether the headrest 112 is positioned properly in the event of a collision. In some instances, the sensor 114 may represent an IR LED distance sensor, an ultrasonic sensor, a proximity sensor (e.g., capacitance, resistive, etc.), and/or an imaging sensor (e.g., camera). In instances where the sensor 114 comprises a IR LED, or other light-emitting sensor (e.g., laser), the emitted light may be human safe, such as having a wavelength longer than approximately 1.4 micrometers (μm). As shown, the sensor 114 may be mounted on top of the headrest 112 (e.g., top side). However, in some instances, the sensor 114 may be arranged on side(s) of the headrest 112 (e.g., lateral sides), a front of the headrest 112 (e.g., facing the occupant 110), and/or embedded within the headrest 112.

In some instances, the sensor 114 is arranged to output a signal 116 (e.g., light, sound, etc.) in a direction towards the occupant 110. The signal 116 may reflect off object(s) within an interior of the vehicle 102, such as the occupant 110. The sensor 114 then captures or receives the reflected signal and determines a distance to the occupant 110. This distance may be used to indicate whether the headrest 112 is properly positioned relative to the occupant 110 and in the event of a collision. In some instance, the reflected signal may indicate a position of the occupant 110, or the head of the occupant 110, relative to the headrest 112.

In the event that the sensor 114 includes a camera, for instance, the sensor 114 may capture image data depicting the occupant 110. Therein, the image data may be analyzed for determining a position of the head and/or the occupant 110. Moreover, although the headrest 112 is shown including the sensor 114, the vehicle 102 may include additional sensor(s) for determining the position of the occupant 110. These additional sensor(s) may be mounted within an interior of the vehicle 102. For example, camera(s) may be mounted on a ceiling within the interior of the vehicle 102, on the headrest 112, etc. and image the occupant 110 and/or the headrest 112 for use in determining the position of the head and/or the occupant 110 relative to the headrest 112. In some instances, the camera(s) may detect the pose and/or position of the occupant(s) 110 relative to the headrest 112.

Additionally, in some instances, the camera(s) may also detect objects such as hats, bags, etc. that may interfere with deployment of the headrest 112 and/or which are taken that into account when deciding whether to deploy the headrest 112. Examples of object detection and classification are discussed in, for example, U.S. Pat. No. 10,303,961 titled "Object Detection and Passenger Notification," issued May 8, 2019, which is incorporated by reference herein in its entirety.

Turning to the flow diagram in FIG. 1, an operation 118 may include determining a collision probability associated with the vehicle 102 and the object 104. In some instances, the collision probability may be determined based on a predicted intersection between the vehicle 102 and the object 104. The predicted intersection may be associated with a predicted location of the vehicle 102 and the predicted location of the object 104 at a future instance in time. As discussed in detail herein, the vehicle 102 may include one or more system(s), such as a safety system, that determines the collision probability based on sensor data received by sensor(s) of the vehicle 102, sensor(s) from other vehicles, sensor(s) associated with the vehicle 102, and so forth. The sensor data may include data associated with the vehicle 102 and the object 104, such as information associated with physical characteristics, a location, and/or a movement associated with the vehicle 102 and the object 104. Based on the sensor data, as well as the vehicle trajectory 106 and/or the object trajectory 108, the safety system may determine the collision probability. The collision probability may represent a likelihood, or risk, of a collision between the vehicle 102 and the object 104. Additionally, in some instances, the safety system may determine whether the collision is imminent. Whether the collision is imminent may be based on predicting that the collision occurs within a certain amount of time (e.g., one second, two seconds, etc.).

In some instances, the vehicle 102 may filter those objects of interest within the environment 100 to determine which objects are further processed. For example, the vehicle 102 may identify those objects with a highest probability of colliding or otherwise interfering with the vehicle 102 to devote more processing resources to the objects most likely to collide or otherwise interfere with the vehicle 102. Examples of identifying objects having different probabilities of interfering with the vehicle 102 and providing different levels of further processing for the objects are discussed in, for example, U.S. patent application Ser. No. 17/090,712 titled "Allocation of Safety System Resources Based on Probability of Intersection," filed Nov. 5, 2020, which is incorporated by reference herein in its entirety.

An operation 120 may include determining that the collision probability is greater than a threshold probability. As discussed herein, based on the collision probability being greater than the threshold probability, the vehicle 102 (e.g., the safety system) may undertake action(s) to mitigate the collision, reduce an effect of the collision, or to increase the safety of occupant(s) of the vehicle 102, occupant(s) of the object 104, bystanders, the environment, etc. For example, as discussed herein, the action(s) may include adjusting a position of the headrest 112 to reduce whiplash or hyperextension of the head and/or neck of the occupant 110.

An operation 122 may include determining a position of a headrest of the vehicle relative to a head of an occupant. For example, introduced above, the sensor 114 may output the signal 116 in a direction towards the head of the occupant 110. The signal 116 may reflect off the head and the sensor 114 may capture (e.g., sense) this reflected signal. Based on the reflected signal, the sensor 114 or another system of the vehicle 102, such as the safety system, may determine the position of the headrest 112 relative to the occupant 110, vice versa. For example, as shown at the operation 122, a top of the headrest 112 may be substantially aligned with the center of the head of the occupant 110. However, the headrest 112 may be positioned in other locations relative to the occupant 110. Regardless, as shown at the operation 122, the headrest 112 may be positioned below or too low the top of the headrest 112. In this position, if a collision were to occur, the head of the occupant 110 may be forced backwards, over a top of the headrest 112.

An operation 124 may include determining that the headrest is out of position for the predicted collision. For example, the safety system may determine, based at least in part on the position of the headrest 112 as determined at operation 122, that the headrest 112 is out of position for the collision (or the predicted collision). Determining whether the headrest 112 is out of position may include determining that the headrest 112 is not within a certain vertical position or a certain horizontal position relative to the head of the occupant 110. For example, as introduced above at the operation 122, the sensor 114 may detect the reflected signal and determine a horizontal distance 132 between the head of the occupant 110 and the headrest 112. In instances where the signal 116 reflects off the head of the occupant 110, this may indicate that the headrest 112 is not appropriately vertically positioned (e.g., the headrest 112 is too low). In other words, when the head of the occupant 110 is detected via the reflected signal, this may indicate that the headrest 112 is not properly positioned in one or more directions. For example, to safely protect the occupant 110 against whiplash or hyperextension, the top of the headrest 112 may be substantially aligned with the top of the head of the occupant 110 or the center of the headrest 112 may be substantially aligned with the center of the head of the occupant 110. Comparatively, as discussed herein, when the reflected signal does not indicate the presence of the head of the occupant 110 in close proximity, this may indicate that the signal 116 passed over the top of the head of the occupant 110 and/or that the top of the headrest 112 is positioned above the top of the head of the occupant 110.

To further illustrate, as shown in FIG. 1 at operation 124, a vertical distance 126 may be disposed between a center 128 (e.g., vertical and/or horizontal center) of the headrest 112 and a center 130 (e.g., vertical and/or horizontal center) of the head of the occupant 110. When the vertical distance 126 is within a certain threshold of the center 130, the headrest 112 may be properly vertically positioned. For example, in some instances, when the vertical distance 126 is between zero (0) cm and 10 cm above the center 130, the headrest 112 may be properly positioned on the occupant 110. In such instances, the top of the headrest 112 may be aligned, or substantially aligned with the top of the head of the occupant 110. In some instances, when the center 128 and the center 130 are aligned, or substantially aligned, the headrest 112 may be properly vertically positioned. In some instances, the vertical distance 126 may be determined using known dimensions of the headrest 112 and/or known distances between the sensor 114 and the center 128. As shown in FIG. 1 at 124, the center 128 may be positioned below the center 130, and as such, the headrest 112 may be determined to be out of position for safely protecting the occupant 110 during a collision.

Moreover, as also shown in FIG. 1, a horizontal distance 132 may be disposed between the headrest 112 and the back of the head of the occupant 110. In some instances, the horizontal distance 132 may be determined via the reflected signal captured by the sensor 114. Ideally, the headrest 112 may contact the back of the head to limit whiplash in the event of a collision. For example, by contacting the head of the occupant 110 sooner during a collision, the headrest 112 may have a greater distance over which to absorb energy of the collision, thereby reducing forces applied to the head and neck of the occupant. However, in some instances, when the horizontal distance 132 is within a threshold distance of the occupant (e.g., range), the headrest 112 may be properly horizontally positioned. For example, in some instances, when the horizontal distance 132 is between zero (0) cm and 5 cm, the headrest 112 may be properly horizontally positioned. In some instances, the horizontal distance 132 may be determined using known dimensions of the headrest 112 and/or known distances between the sensor 114 and the center 128. Although the horizontal distance 132 is shown being between the headrest 112 and the back of the head of the occupant 110, the horizontal distance 132 may be represented between the center 128 of the headrest and the center 130 of the head of the occupant 110.

In some instances, at operation 124, camera(s) of the vehicle 102 may be used to determine whether the headrest is out of position or whether the headrest 112 is properly positioned relative to the occupant 110 and in the event of a collision. For example, camera(s) within an interior of the vehicle 102 may detect the position of the head of the occupant 110 and the position of the headrest 112. Whether the head of the occupant 110 is positioned correctly relative to the headrest 112, vice versa, may involve similar operations as discussed above. For example, image data captured by the camera(s) may be used to determine whether a top of the headrest 112 is within a certain vertical distance 126 and/or horizontal distance 132.

In some instances, the center 130 of the head may be determined using the sensor(s) 114, camera(s) within the vehicle 102, and/or other sensor(s) positioned or disposed on the headrest 112. For example, a sensor may be integrated within the headrest 112 (e.g., at the center 128) and may image the head of the occupant 110. The image(s) may be analyzed to determine a volume or area occupied by the head of the occupant 110 for use in determining the center 130. As another example, camera(s) within the vehicle 402 may image the head of the occupant 110 for use in determining the center 130.

An operation 134 may include actuating the headrest in one or more directions and/or about one or more axes. For example, based at least in part on determining, at operation 124, that the headrest 112 is out of position, the headrest 112 may be actuated to properly position the headrest 112 for the predicted collision. In some instances, the headrest 112 and/or a seat operably connected to the headrest 112 may include actuators (e.g., screw driven, linear, gear driven), motors and/or gears, (e.g., servo motors), pneumatic cylinders, electromagnetic, pyrotechnics (e.g., compressed gas) that function to position the headrest 112. In some instances, the safety system may control movement and/or actuation of the headrest 112 and/or the headrest 112 and/or the seat may include modules, controllers, etc. that control adjustment of the headrest 112. Adjustment of the headrest 112 may occur in advance of the collision and with enough time to permit adjustment. For example, in some instances, the actuators may actuate within 400 milliseconds to 500 milliseconds after determining the predicted collision to properly position the headrest 112. The instructions (or controls) sent by the safety system for adjusting the headrest 112 may be sent in anticipation of the predicted collision such that the headrest 112 is adjusted, or at least partially adjusted, prior to the predicted collision.

In some instances, the headrest 112 may operable couple to the seat via one or more posts, rods, or shafts 136. The shafts 136 may be coupled to the actuators or otherwise engaged with actuators (e.g., gear and teeth) to increase in length (e.g., an exposed length) for vertically adjusting the position of the headrest 112. As shown at 134, actuating the headrest 112 may adjust the vertical distance 126, where the vertical distance 126 may be between 5 cm and 10 cm vertically above the center 130 of the head of the occupant 110.

Additionally, within the headrest 112 and/or the seat, shafts may engage with actuators for moving the headrest 112 horizontally towards the occupant 110. For example, the headrest 112 may be extended laterally towards the occupant 110 such that the horizontal distance 132 is zero (0) cm or substantially zero (0) cm. In some instances, positioning the headrest 112 may also include rotating the headrest 112 in a direction towards the occupant 110. For example, the headrest 112 may include actuators that rotate the headrest 112 into contact or in close proximity to the back of the head of the head of the occupant 110. In some instances, rotating the headrest 112 may dispose a top of the headrest 112 above a top of head of the occupant 110 for protecting against whiplash and/or hyperextension. In some instances, the headrest 112 may be rotated between zero (0) degrees and 20 degrees relative to a vertical axis of the headrest 112.

In some instances, determining whether to actuate the headrest 112 may be based at least in part on the direction of travel and/or a direction of impact associated with the predicted collision. For example, in instances where the impact or collision is projected to occur at the front of the vehicle 102, relative to the direction of travel in FIG. 1, the headrest 112 may be adjusted to reduce whiplash or hyperextension of the neck of the occupant 110, which is positioned rearward facing. In some instances, the vehicle 102 may include additional occupant(s) that are forward facing and may not be subject to hyperextension of the neck during a collision. However, in some instances, the headrest of forward facing occupants may be adjusted to counteract or dampen rebound forces after the collision.

After actuating the headrest 112, at the operation 134, the sensor 114 may be positioned above the head of the occupant 110. In such instances, the signal 116 emitted by the sensor 114 may vertically pass over a top of the head of the occupant 110. The reflected signal received by the sensor 114 may indicate a distance between the sensor 114 and additional objects in the vehicle 102 (e.g., opposing seats, interior surfaces, etc.). However, the measured distance may be greater than a distance indicative of the head of the occupant 110. This may indicate that the top of the headrest 112 is positioned above the head of the occupant 110.

Figure 2:
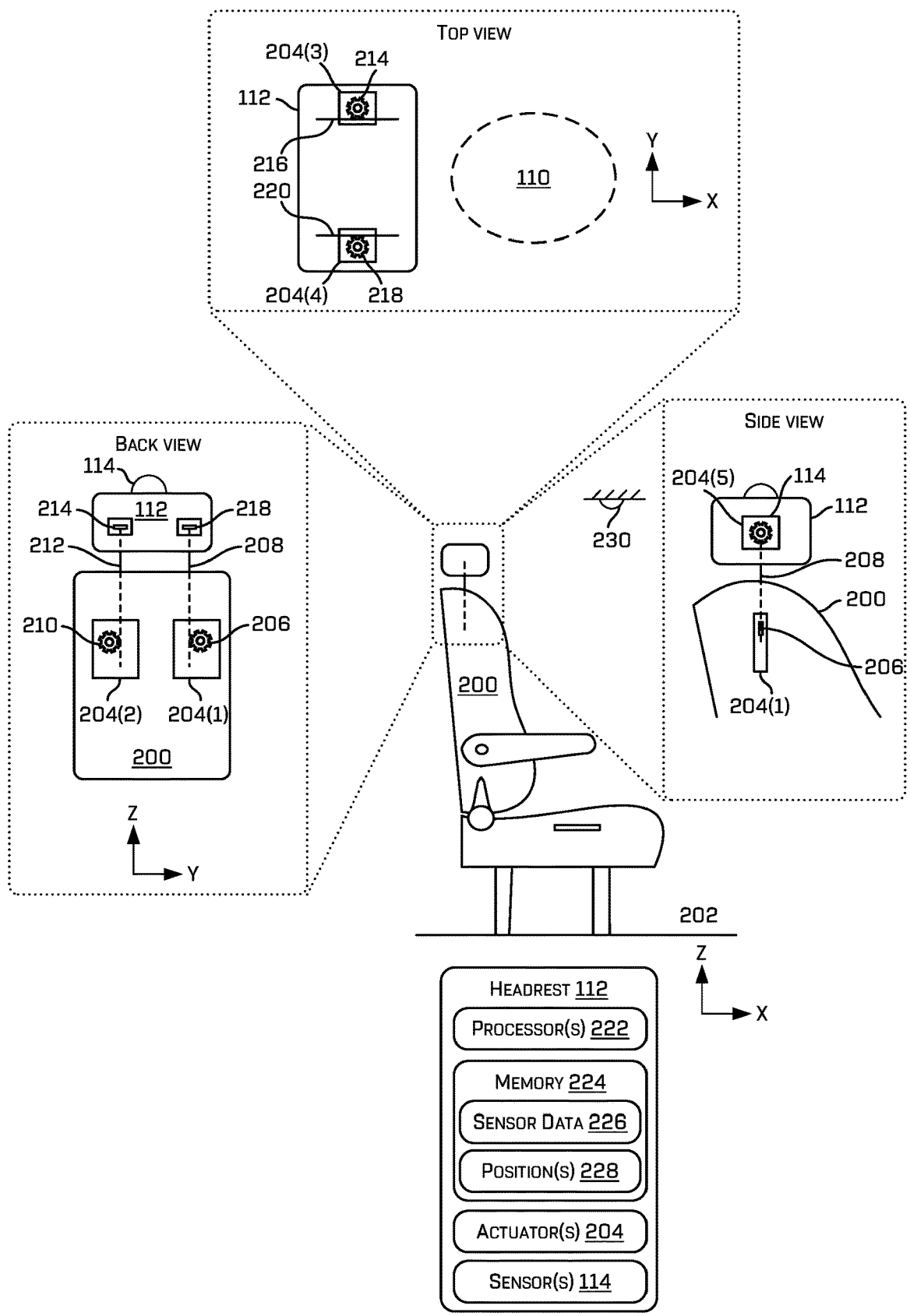
FIG. 2 is an example seat and/or headrest capable of being adjusted based on a predicted or actual collision.

Although the above discussion is with regard to positioning the headrest 112 using the center 128 of the headrest 112 and the center 130 of the head of the occupant 110, or relative to the center 130 of the head of the occupant 110, other relations are envisioned. For example, the top of the headrest 112 may be positioned relative to a top of the head of the occupant 110, or the center 128 of the headrest 112 may be positioned relative to the top of the head of the occupant 110. Moreover, although a particular headrest is shown in FIG. 1, it is to be understood that headrests may include additional shapes, contours, sizes, and so forth. In such instances, sensor(s) of the headrest 112 and/or sensor(s) within the vehicle 102 may determine the position of the headrest and/or the position of the occupant for positioning the headrest 112 and reducing whiplash or hyperextension. Still, the discussion herein relates to adjusting a single headrest 112 but it is to be understood that the vehicle 102 may include additional headrests and/or sensors for measuring the position of the head of additional occupants seated in additional seats of the vehicle 102. In such instances, the additional headrests may include similar components as the headrest 112 and/or function similarly as the headrest 112. Therefore, the vehicle may include multiple seating positions having respective headrest(s) and the position and/or orientation of the headrest(s) may be independently adjusted based on a size and position of an occupant occupying the seating position, respectively. Thus, each headrest may be adjusted on a per-occupant basis FIG. 2 illustrates example components of a seat 200 and the headrest 112 of the vehicle 102. In some instances, the seat 200 may be coupled to a floorboard, frame, body, or carriage 202 of the vehicle 102.

The seat 200 may include actuator(s) 204 for vertically adjusting the headrest 112 and/or horizontally adjusting the headrest 112. In some instances, the actuator(s) 204 may include a first actuator 204(1) and a second actuator 204(2) for vertically adjusting the headrest 112 (Z-direction). The first actuator 204(1) and the second actuator 204(2) may actuate to either extend the headrest 112 from the seat 200 and/or retract the headrest 112 towards the seat 200. For example, in some instances, the first actuator 204(1) may include a first gear 206 that engages with a first shaft 208 (e.g., the shaft 138). The first shaft 208 may include notches, slots, tabs, channels, and so forth that engage with complimentary teeth of the first gear 206. As such, the first gear 206 may engage with the first shaft 208 at various positions along a longitudinal length of the first shaft 208. As shown, the first shaft 208 may be at least partially disposed within the first actuator 204(1) and/or within the seat 200, at least partially disposed external to the seat 200 (e.g., between the headrest 112 and the seat 200), and at least partially disposed within the headrest 112 for operably coupling the headrest 112 to the seat 200.

Additionally, in some instances, the second actuator 204(2) may include a second gear 210 that engages with a second shaft 212 (e.g., the shaft 138). The second shaft 212 may include notches, slots, tabs, channels, and so forth that engage with complimentary teeth of the second gear 210. As such, the second gear 210 may engage with the second shaft 212 at various positions along a longitudinal length of the second shaft 212. As shown, the second shaft 212 may be at least partially disposed within the second actuator 204(2) and/or within the seat 200, at least partially disposed external to the seat 200 (e.g., between the headrest 112 and the seat 200), and at least partially disposed within the headrest 112 for operably coupling the headrest 112 to the seat 200.

The headrest 112 may include additional actuators, such as a third actuator 204(3) and/or a fourth actuator 204(4). The third actuator 204(3) and the fourth actuator 204(4) may horizontally adjust the headrest 112 (X-direction). When actuated, the third actuator 204(3) and the fourth actuator 204(4) may horizontally position the headrest 112 closer to the back of the head of the occupant 110 and/or further away from the head of the occupant 110.

The third actuator 204(3) may include a third gear 214 that engages with a third shaft 216. The third shaft 216 may include notches, slots, tabs, channels, and so forth that engage with complimentary teeth of the third gear 214. As such, the third gear 214 may engage with the third shaft 216 at various positions along a longitudinal length of the third shaft 216. As shown, the third shaft 216 may be disposed within the headrest 112. Similarly, the fourth actuator 204(4) may include a fourth gear 218 that engages with a fourth shaft 220. The fourth shaft 220 may include notches, slots, tabs, channels, and so forth that engage with complimentary teeth of the fourth gear 218. As such, the fourth gear 218 may engage with the fourth shaft 220 at various positions along a longitudinal length of the fourth shaft 220. As shown, the fourth shaft 220 may be disposed within the headrest 112. In some instances, the third gear 214 may be disposed about the second shaft 212 and/or the fourth gear 218 may be disposed about the first shaft 208.

The first actuator 204(1) and the second actuator 204(2) may operate in unison such that sides or ends of the headrest 112 are vertically extended by equal amounts. However, in some instances, a single shaft and/or a single actuator may operably couple the headrest 112 and the seat 200 for adjusting a vertical position of the headrest 112. Moreover, in some instances, the third actuator 204(3) and the fourth actuator 204(4) may operate in unison such that sides or ends of the headrest 112 are horizontally extended by equal amounts. In some instances, rather than including the third actuator 204(3) and the fourth actuator 204(4), the headrest 112 may include a single actuator for horizontally adjusting the headrest 112.

In some instances, the headrest 112 may include a fifth actuator 204(5) for rotationally adjusting the headrest 112. For example, the fifth actuator 204(5) may pivot the headrest 112 towards the occupant 110, about the Y-axis, for example.

Although FIG. 2 illustrates the actuator(s) 204 including gears, other actuators are envisioned for adjusting the position of the headrest 112. For example, the headrest 112 and/or the seat 200 may include pneumatic or hydraulic cylinders that extend and/or retract rods at various lengths for vertically and/or horizontally positioning the headrest. Servo motors, pyrotechnics, and/or other gear-based drives may also be used for adjusting the position of the headrest 112.

Additionally, in some instances, rather than including separate actuators for adjusting the vertical position and the horizontal position of the headrest 112, the headrest 112 and/or the seat 200 may include a single actuator that both horizontally and/or vertically adjust the headrest 112. For example, actuator(s) in the seat 200 may pivot or rotate (e.g., about the Y-axis). Such rotation may lower or raise a height of the headrest 112 (e.g., Z-direction) and retract or extend the headrest 112 from the occupant 110 (e.g., X-direction). In some instances, a revolute joint may be utilized for obtaining both horizontal and/or vertical adjustment of the headrest 112.

As shown in FIG. 2, the headrest 112 may include processor(s) 222 and memory 224, where the processor(s) 222 may perform various functions and operations associated with actuating the headrest 112 and the memory 224 may store instructions executable by the processor(s) 222 to perform the operations described herein. As shown, the memory 224 may store, or have access to, sensor data 226 captured by the sensor 114 (or other sensor(s) within the vehicle 102). In some instances, the sensor data 226 may represent a position or distance to the head of the occupant 110 for use in adjusting the position of the headrest 112. Additionally, the memory 224 may store or have access to position(s) 228 of the headrest 112. In some instances, the position(s) 228 may be utilized by the processor(s) 222 for adjusting the headrest 112. For example, the position(s) 228 may represent positions at which to position the headrest 112, based on the sensor data 226, and the processor(s) 222 may cause (e.g., instruct, control, etc.) the actuators 204 to position the headrest 112 accordingly.

Additionally, or alternatively, in some instances a camera 230 may mount or be disposed within an interior of the vehicle 102 (e.g., ceiling). The camera 230 may mount at a central position within the interior for imaging a position of the headrest 112 and/or a position of the head of the occupant relative to the headrest 112. Although illustrate as being mounted on the ceiling, the camera 230 may be mounted to sides, within the interior, and/or on the headrest 112.

Although shown as being included within the headrest 112, the seat 200 may include components (e.g., controller(s), etc.) for effectuating movement of the headrest 112 and/or the seat 200. Additionally, and/or alternatively, as discussed above, the vehicle 102 may include a safety system communicatively coupled to the actuator(s) 204 in the headrest 112 and/or the seat 200. In such instances, controller(s) of the headrest 112 and/or the seat 200 may receive instructions or controls from the safety system for positioning the headrest 112.

Figure 3:
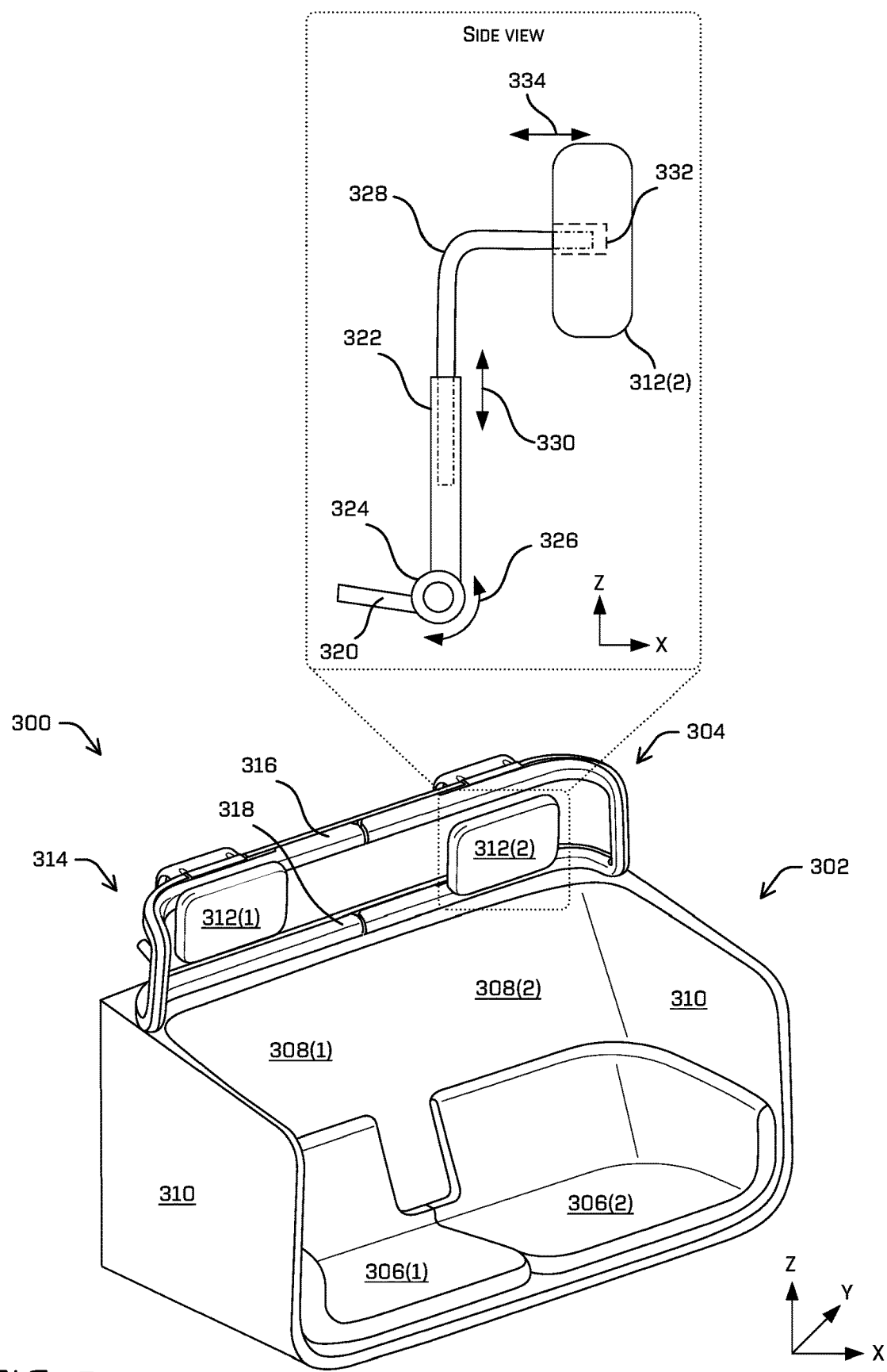
FIG. 3 is an example seat and/or headrest capable of being adjusted based on a predicted or actual collision.

FIG. 3 illustrates a portion 300 of an interior of a vehicle, such as the vehicle 102. The portion 300 generally includes a seating area 302 and a headrest 304 associated with the seating area 302. In more detail, the seating area 302 includes a first seat portion 306(1) having a corresponding first seatback portion 308(1) and a second seat portion 306(2) having a corresponding second seatback portion 308(2). In the example of FIG. 3, the seating area 302 may terminate at lateral sides 310. However, the lateral sides 310 are shown for example only. In some instances, the lateral sides 310 may be interior, lateral sides of the vehicle 102 in which the seating area 302 and the headrest 304 are disposed.

The headrest 304 may include a first passenger headrest portion 312(1) and a second passenger headrest portion 312(2). As discussed herein, the first passenger headrest portion 312(1) and the second passenger headrest portion 312(2) may function similarly as the headrest 112 for adjusting in position and accommodating the occupant 110 in the event of a predicted collision. In this sense, FIG. 3 and the first passenger headrest portion 312(1) and the second passenger headrest portion 312(2) may represent an alternate, or another, embodiment of a headrest that adjusts in position. The first passenger headrest portion 312(1) and/or the second passenger headrest portion 312(2) may include materials that deform plastically (e.g., crush) to absorb energy during collision. This may provide the first passenger headrest portion 312(1) and/or the second passenger headrest portion 312(2) with a greater distance over which to absorb energy of the collision to reduce the forces applied to the occupants' heads and necks.

As illustrated, the first passenger headrest portion 312(1) generally corresponds to the first seat portion 306(1) and the corresponding first seatback portion 308(1), and the second passenger headrest portion 312(2) generally corresponds to the second seat portion 306(2) and the corresponding second seatback portion 308(2). As also illustrated in FIG. 3, the headrest 304 may also include an outer frame 314 generally disposed above the first seatback portion 308(1) and the second seatback portion 308(2). In some instances, the outer frame 314 may be a transverse frame including a top member 316 and a bottom member 318 generally extending, respectively, above and below the first passenger headrest portion 312(1) and the second passenger headrest portion 312(2). However, the first passenger headrest portion 312(1) and the second passenger headrest portion 312(2) may be disposed external to the outer frame 314 such that the first passenger headrest portion 312(1) and the second passenger headrest portion 312(2) may vertically and/or horizontally adjust. Moreover, the top member 316 and the bottom member 318 may terminate at lateral ends, which may generally align with the lateral sides 310 of the seating area 302. As also illustrated, the top member 316 and the bottom member 318 may be curved proximate the lateral ends. In examples, the U-shape provides a wrap-around headrest, such that the lateral ends are positioned proximate a side of the head of the occupant when the occupant is seated in the seating area 302.

The first passenger headrest portion 312(1) and the second passenger headrest portion 312(2) are shown at different vertical positions (Z-direction) and may be positioned differently for different occupant sizes. As shown, the first passenger headrest portion 312(1) and the second passenger headrest portion 312(2) may individually adjust for respective occupants seated. For example, the first passenger headrest portion 312(1) may be disposed vertically higher than the second passenger headrest portion 312(2). However, in some instances, the headrest 304 may adjust as a single component such that the headrest 304 and the components 304-316 adjust collectively.

In the example of FIG. 3, the seating area 302 is configured for up to two passengers, each with a corresponding headrest (e.g., the first passenger headrest portion 312(1) and the second passenger headrest portion 312(2)). In other instances, implementations may apply to more or fewer seats. For example, the headrest 304 may be associated with a single seat or with a seating area 302 configured for more than two passengers. For instance, the seating area 302 may be wide enough to seat three passengers, and the headrest 304 could include another passenger headrest portion (e.g., similar to the first passenger headrest portion 312(1) and the second passenger headrest portion 312(2)).

The first passenger headrest portion 312(1) and the second passenger headrest portion 312(2) may be configured to minimize the effects of a collision in which an occupant is seated in the seating area 302. For example, in FIG. 3, a detailed view of the second passenger headrest portion 312(2) is shown including components for adjusting a position of the second passenger headrest portion 312(2). In some instances, the second passenger headrest portion 312(2) may include similar components as the headrest 112 for determining a position of the head of the occupant 110 and/or a position of head of the occupant relative to the second passenger headrest portion 312(2). Although the discussion is with regard to the second passenger headrest portion 312(2), it is to be understood that the first passenger headrest portion 312(1) may include similar components and/or function similarly.

In some instances, the second passenger headrest portion 312(2) includes a base 320 that couples to the bottom member 318 of the outer frame 314. The base 320 may operably couple to a vertical member 322 via a hinge 324. For example, the hinge 324 may be actuated (e.g., via a controller) for rotating in a direction 326 (Y-axis) and changing an orientation and/or position of the second passenger headrest portion 312(2). In some instances, the hinge 324 may give way or dampens the forces of rebound to prevent neck injury. For example, the hinge 324 may deform, bend, pivot, or otherwise release force gradually if the force exerted by the head of the occupant(s) exceeds a threshold. In some examples, hinge 324 may include a detent mechanism or frictional material disposed between a hinge pin and an outer portion of the hinge and configured to resist rotation during normal use and to allow the hinge to rotate under load of an occupant's head during a collision to absorb energy during the collision.

The headrest 304 may further includes a shaft 328 that extends into the vertical member 322. The shaft 328 may extend into the vertical member 322 at various lengths for adjusting a vertical position 330 of the second passenger headrest portion 312(2) (Z-direction). In some instances, the shaft 328 and the vertical member 322 may be extendable via a linear actuator (e.g., screw thread, a linear gear or rack, a hydraulic piston, etc.), such that the shaft 328 may extend at various distances from the vertical member 322. For example, motor(s) within the vertical member 322 may be actuated to push the shaft 328 to upward and increase a height of the second passenger headrest portion 312(2) and/or the motor(s) may be actuated to retract the shaft 328 into the vertical member 322 to decrease a height of the second passenger headrest portion 312(2).

Additionally, the shaft 328 may extend at various distances from a horizontal member 332 disposed with the second passenger headrest portion 312(2). The shaft 328 may extend into the horizontal member 332 at various lengths for adjusting a horizontal position 334 of the second passenger headrest portion 312(2) (X-direction). In some instances, the shaft 328 and the horizontal member 332 may resemble components of a linear actuator, such that the shaft 328 may extend at various distances from the horizontal member 332. For example, motor(s) within the horizontal member 332 may be actuated to push the shaft 328 outward to position the second passenger headrest portion 312(2) closer to the head of the occupant and/or the motor(s) may be actuated to retract the shaft 328 and retract the second passenger headrest portion 312(2) away from the head of the occupant.

Although the second passenger headrest portion 312(2) is discussed as being adjusted via the shaft 328 and actuators within the vertical member 322 and/or the horizontal member 332, the second passenger headrest portion 312(2) and/or the seating area 302 may include other actuator(s) for changing a position of the second passenger headrest portion 312(2). These actuator(s) may be disposed in seating area 302, the second passenger headrest portion 312(2), and/or other portions of the vehicle (e.g., behind the seating area 302). As discussed, the actuators may comprise electromechanical mechanisms (e.g., motors, gears, screw shafts, etc.), hydraulic mechanisms (e.g., hydraulic pumps, valves, cylinders, etc.), pneumatic mechanisms (e.g., compressors, valves, cylinders, etc.), pyrotechnic mechanisms, or any other mechanisms configured to quickly and reliably position the headrest(s) of the vehicle in the event of a collision. The actuator(s) may adjust the vertical position of the headrest, the horizontally position of the headrest, and/or the orientation of the headrest.

Figure 4:
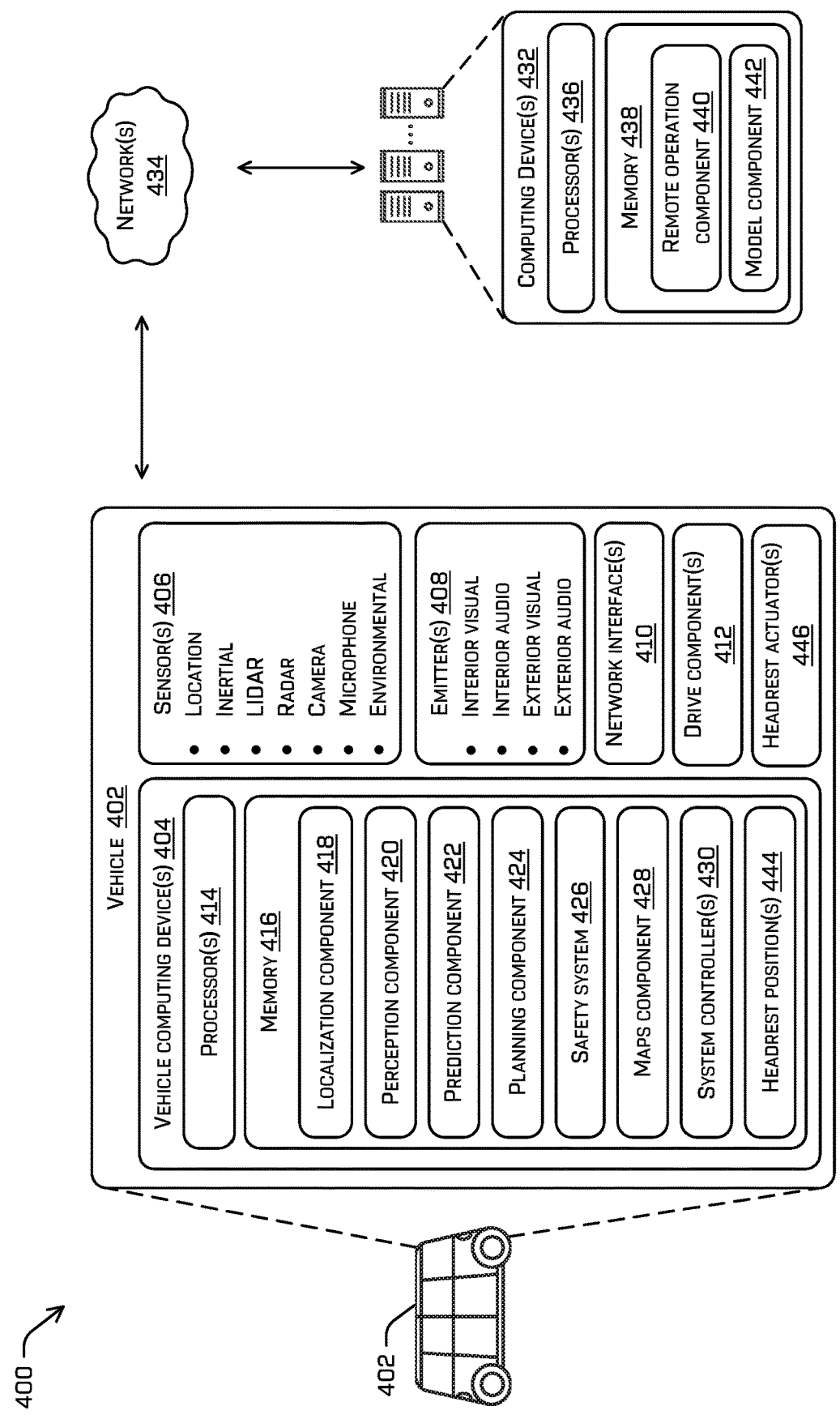
FIG. 4 is a block diagram of an example system for implementing the techniques described herein.

FIG. 4 illustrates a block diagram of an example system 400 that implements the techniques discussed herein. In some instances, the example system 400 may include a vehicle 402, which may represent the vehicle 102 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well.

The vehicle 402 may include one or more vehicle computing device(s) 404, one or more sensor(s) 406, one or more emitter(s) 408, one or more network interface(s) 410 (also referred to as communication devices and/or modems), and one or more drive component(s) 412. In some instances, the one or more sensor(s) 406 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor(s) 406 may include multiple instances of each of these or other types of sensors. For instance, the time-of-flight sensors may include individual time-of-flight sensors located at the corners, front, back, sides, and/or top of the vehicle 402. As another example, the camera sensors may include multiple cameras disposed at various locations about the exterior and/or interior of the vehicle 402 (e.g., ceiling, headrest(s), etc.). Additionally, the sensor(s) 406 include distance sensor(s) for determining a position of a headrest of the vehicle 402 relative to an occupant of the vehicle 402. In such instances, the sensor(s) 406 may be disposed on the headrest and/or within an interior of the vehicle 402. The one or more sensor(s) 406 may provide input to the vehicle computing device(s) 404.

The one or more emitter(s) 408 may emit light and/or sound. The one or more emitter(s) 408 in this example may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 may also include one or more network interface(s) 410 that enable communication between the vehicle 402 and one or more other local or remote computing device(s) (e.g., a remote teleoperation computing device) or remote services. For instance, the one or more network interface(s) 410 may facilitate communication with other local computing device(s) on the vehicle 402. Also, the one or more network interface(s) 410 may allow the vehicle 402 to communicate with other nearby computing device(s) (e.g., other nearby vehicles, traffic signals, etc.). The one or more network interface(s) 410 may include physical and/or logical interfaces for connecting the vehicle computing device(s) 404 to another computing device or one or more external networks (e.g., the Internet). For example, the one or more network interface(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 4G, etc.), satellite communication, dedicated short range communications (DSRC), or any suitable wired or wireless communications protocol that enables the respective computing device to interface with the other computing device(s).

In at least one example, the vehicle 402 may include one or more drive component(s) 412. In some examples, the vehicle 402 may have a single drive component 412. In at least one example, the vehicle 402 may have multiple drive components 412, where individual drive components 412 may be positioned on opposite ends of the vehicle 402 (e.g., the front and the rear, etc.). In at least one example, the drive component(s) 412 may include the one or more sensor(s) 406 to detect conditions of the drive component(s) 412 and/or the surroundings of the vehicle 402. By way of example and not limitation, the sensor(s) 406 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive component(s) 412. In some cases, the sensor(s) 406 on the drive component(s) 412 may overlap or supplement corresponding systems of the vehicle 402 (e.g., sensor(s) 406).

The drive component(s) 412 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 412 may include a drive system controller which may receive and preprocess data from the sensor(s) 406 and to control operation of the various system(s) and/or component(s) of the vehicle 402. In some examples, the drive system controller may include one or more processor(s) and memory communicatively coupled with the one or more processor(s). The memory may store one or more components to perform various functionalities of the drive component(s) 412. Furthermore, the drive component(s) 412 also include one or more communication connection(s) that enable communication by the respective drive system with one or more other local or remote computing device(s).

As shown, the vehicle computing device(s) 404 may include one or more processor(s) 414 and memory 416 communicatively coupled with the one or more processor(s) 414. In the illustrated example, the memory 416 of the vehicle computing device(s) 404 stores a localization component 418, a perception component 420, a prediction component 422, a planning component 424, a safety system 426, a map component 428, and one or more system controller(s) 430. Though depicted as residing in the memory 416 for illustrative purposes, it is contemplated that the localization component 418, the perception component 420, the prediction component 422, the planning component 424, the safety system 426, the map component 428, and the one or more system controller(s) 430 may additionally, or alternatively, be accessible to the vehicle computing device(s) 404 (e.g., stored in a different component of vehicle 402) and/or be accessible to the vehicle 402 (e.g., stored remotely).

In the memory 416 of the vehicle computing device(s) 404, the localization component 418 may include functionality to receive data from the sensor(s) 406 to determine a position of the vehicle 402. For example, the localization component 418 may include and/or request/receive a three-dimensional map of an environment and may continuously determine a location of the autonomous vehicle within the map. In some instances, the localization component 418 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 418 may provide data to various components of the vehicle 402 to determine an initial position of the vehicle 402 for generating a trajectory, as discussed herein.

The perception component 420 may include functionality to perform object detection, segmentation, and/or classification. In some examples, the perception component 420 may provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In some instances, the perception component 420 may include functionality to store perception data generated by the perception component 420. In some instances, the perception component 420 may determine a track corresponding to an object that has been classified as an object type. The stored perception data may, in some examples, include fused perception data captured by the vehicle 402. Fused perception data may include a fusion or other combination of sensor data from sensor(s) 406, such as image sensors, lidar sensors, radar sensors, time of flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.).

In additional and/or alternative examples, the perception component 420 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 420 may use perception algorithms to determine a perception based bounding box associated with an object in the environment based on sensor data. For example, the perception component 420 may receive image data from the one or more sensor(s) 406 and classify the image data to determine that an object is represented in the image data. Then, using detection algorithms, the perception component 420 may generate a two dimensional bounding box and/or a perception based three dimensional bounding box associated with the object. The perception component 420 may further generate a three dimensional bounding box associated with the object. The three dimensional bounding box may provide additional information such as a location, orientation, pose, and/or size (e.g., size, width, height, etc.) associated with the object.

The prediction component 422 may generate one or more probability maps representing prediction probabilities of possible locations of one or more objects in an environment. For example, the prediction component 422 may generate one or more probability maps for vehicles, pedestrians, animals, and the like within a threshold distance from the vehicle 402. In some instances, the prediction component 422 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 424 may determine a path for the vehicle 402 to follow to traverse through an environment. For example, the planning component 424 may determine various routes and paths and various levels of detail. In some instances, the planning component 424 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 424 may generate an instruction for guiding the vehicle 402 along at least a portion of the route from the first location to the second location. In at least one example, the planning component 424 may determine how to guide the vehicle 402 from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 424 may alternatively, or additionally, use data from the perception component 420 and/or the prediction component 422 to determine a path for the vehicle 402 to follow to traverse through an environment. For example, the planning component 424 may receive data from the perception component 420 and/or the prediction component 422 regarding objects associated with an environment. Using this data, the planning component 424 may determine a route to travel from a first location (e.g., a current location) to a second location (e.g., a target location) to avoid objects in an environment.

In at least some examples, such a planning component 424 may determine there is no such collision free path and, in turn, provide a path which brings vehicle 402 to a safe stop avoiding all collisions and/or otherwise mitigating damage.

The safety system 426 may determine headrest position(s) 444 for adjusting the position of a headrest (e.g., the headrest 112) to increase the safety of occupants during predicted collisions. For example, the safety system 426 may determine a collision probability associated with the vehicle 402 and an object. The safety system 426 may determine the collision probability based on a predicted intersection associated with the vehicle 402 and the object. In some instances, the safety system 426 may determine the collision probability is equal to, or greater than, a threshold. In some instances, the safety system 426 may determine velocities of the vehicle 402 with respect to a collision probability. A velocity associated with the vehicle 402 at an initial predicted location may be determined. A velocity associated with the vehicle 402 at an earlier predicted location may be determined based on interpolation between the velocity associated with the vehicle 402 at the initial predicted location and an original velocity associated with the vehicle 402 at a current position (e.g., start position).

Additionally, the safety system 426 may determine an impact location between the vehicle 402 and the object based at least in part on trajectories of the vehicle 402 and/or the object. For example, the safety system 426 may determine that the intersection between the vehicle 402 and the object is on a side, front, rear, etc. of the vehicle 402. In some instances, the safety system 426 may determine whether the vehicle 402 includes rearward facing occupant(s) and/or forward facing occupant(s) within the vehicle 402, using the trajectory of the vehicle 402 and/or the sensor(s) 406.

In some instances, the safety system 426 may determine how to adjust the position of the headrest based on a position of the head of the occupant. For example, if the headrest (or a central position thereof) is positioned below the head of the occupant (or a central position thereof), the safety system 426 may determine to vertically raise the headrest to reduce whiplash and/or hyperextension in the event of a predicted collision. In some instances, based on the predicted collision, the safety system 426 may cause the headrest to be adjusted. For example, the safety system 426 may transmit an instruction to headrest actuator(s) 446 for adjusting the vertical position and/or horizontal position of the headrest. In some instances, the safety system 426 may instruct the headrest actuator(s) 446 to adjust according to the headrest position(s) 444. In some instances, the headrest actuator(s) 446 may include pneumatic cylinder(s), linear actuator(s), screw drivers, servo motor(s), gear-drives, strut(s), motor(s), and so forth.

Moreover, the safety system 426 may receive sensor data from the one or more sensor(s) 406 for knowing a position of the headrest and/or the head of the occupant. Using these positions, the safety system 426 may determine whether to vertically adjust the headrest and/or horizontally adjust the headrest. In some instances, the safety system 426 may adjust the headrest such that a central vertical position of the headrest is horizontally aligned with a central vertical position of the head of the occupant. In some instances, at this position, a top of the headrest may be aligned, or substantially aligned, with a top of the head of the occupant. Alternatively, the central vertical position of the headrest may be positioned between zero (0) cm and 10 cm above the central vertical position of the head of the occupant. In some instances, however, the top of the headrest may be aligned, or substantially aligned, with a top of the head of the occupant.

In some instances, the safety system 426 may be configured to determine a time associated with the predicted collision, or whether the predicted collision is imminent. The time may be a particular time, such as, for example, 120 milliseconds after 3:05 pm, or it may be a time interval from a time in which predicted collision was determined. The time may be determined based on a measured closure rate of the object toward the vehicle 402, a velocity of the vehicle 402, an acceleration of the vehicle 402, a velocity of the object, an acceleration of the object, road conditions, weather conditions, and/or other factors that may affect a closure rate of the object toward the vehicle 402, or vice versa. In such instances, the safety system 426 may transmit instructions to the headrest actuator(s) 446 in advance, and with enough time, for positioning the headrest prior to the predicted collision.

In some instances, the safety system 426 may determine how to position the headrest or what action(s) to take for positioning the headrest based on a time associated with the predicted collision and/or whether the collision has already occurred. For example, positioning the headrest may take different amounts of time depending on the type of actuator. If there is enough time to permit adjustment of the headrest prior to the predicted collision, a reversible adjustment of the headrest may be performed. For example, linear actuators may position the headrest. In instances where there is insufficient time to position the headrest using linear actuators, for example, the safety system 426 may utilize other forms of adjustments. For example, pyrotechnics may be used to adjust the headrest. In such instances, pyrotechnics may adjust the position of the headrest more quickly, or faster than, using mechanical or electric actuators.

More generally, however, the safety system 426 may determine a time associated with the predicted collision, or actual collision, for use in determining how to actuate the headrest. For example, if the collision is predicted to occur under a threshold amount of time, or has already occurred, the safety system 426 may utilize pyrotechnics to adjust the headrest. Comparatively, if the collision is predicted to occur over the threshold amount of time, the safety system 426 may utilize linear actuator(s) to adjust the headrest. In such instances, the use of the linear actuators to adjust the headrest may be a reversable action, whereas if pyrotechnics are used, the vehicle 402 may need to be serviced to recharge the pyrotechnic actuators.

The memory 416 may further include one or more map component(s) 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more map component 428 may include at least one map (e.g., images and/or a mesh). In some examples, the vehicle 402 may be controlled based at least in part on the map component 428. That is, the map component 428 may be used in connection with the localization component 418, the perception component 420 (and sub-components), the prediction component 422, and/or the planning component 424 to determine a location of the vehicle 402, identify objects in an environment, generate prediction probability(ies) associated with objects and/or the vehicle 402, and/or generate routes and/or trajectories to navigate within an environment.

In at least one example, the vehicle computing device(s) 404 may include one or more system controller(s) 430, which may be configured to control steering, propulsion, braking, safety, emitters, communication, and other systems of the vehicle 402. These system controller(s) 430 may communicate with and/or control corresponding systems of the drive component(s) 412 and/or other components of the vehicle 402, which may be configured to operate in accordance with a path provided from the planning component 424.

The vehicle 402 may connect to computing device(s) 432 via a network 434 and may include one or more processor(s) 436 and memory 438 communicatively coupled with the one or more processor(s) 436. In at least one instance, the one or more processor(s) 436 may be similar to the processor(s) 414 and the memory 438 may be similar to the memory 416. In the illustrated example, the memory 438 of the computing device(s) 432 stores a remote operation component 440 and/or a model component 442. In at least one instance, the model component 442, after empirical testing and/or simulations, may generate ML models to be used by the perception component 420, as discussed herein. Though depicted as residing in the memory 438 for illustrative purposes, it is contemplated that the remote operation component 440 and the model component 442 may additionally, or alternatively, be accessible to the computing device(s) 432 (e.g., stored in a different component of computing device(s) 432 and/or be accessible to the computing device(s) 432 (e.g., stored remotely). The model component 442 may include functionality to generate models for determining heights/classifications of multi-channel image data, as discussed herein.

The processor(s) 414 of the vehicle computing device(s) 404 and the processor(s) 436 of the computing device(s) 432 may be any suitable processor capable of executing instructions to process data and perform operations as described herein. By way of example and not limitation, the processor(s) 414 and 436 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 416 vehicle computing device(s) 404 and the memory 438 of the computing device(s) 432 are examples of non-transitory computer-readable media. The memory 416 and 438 may store an operating system and one or more software applications, instructions, programs, and/or data to implement the methods described herein and the functions attributed to the various systems. In various implementations, the memory 416 and 438 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 416 and 438 may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Figure 5:
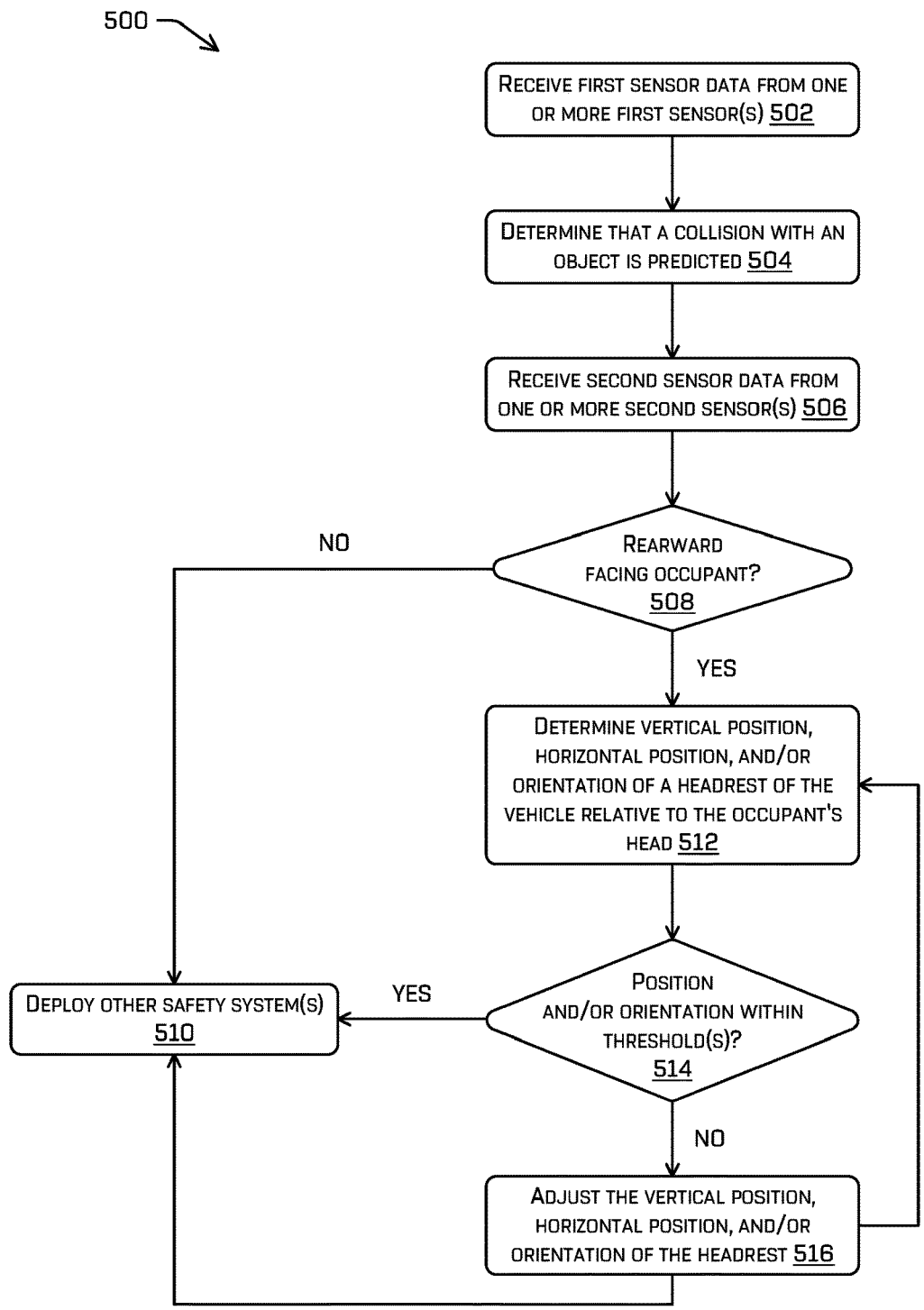
FIG. 5 is an example process for adjusting a headrest of a vehicle.
Figure 6:
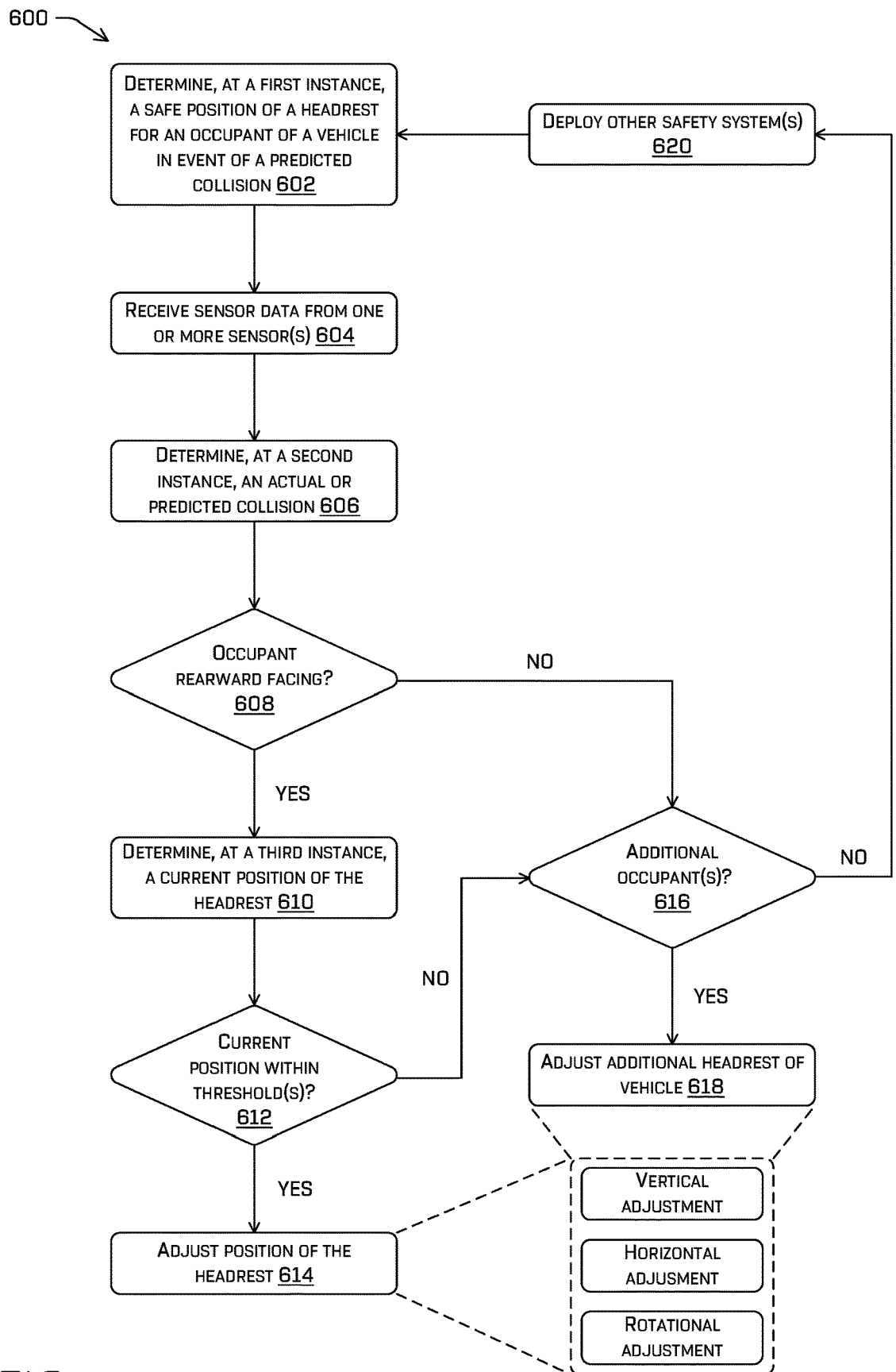
FIG. 6 is an example process for adjusting a headrest of a vehicle.

FIGS. 5-7 illustrate various processes related to adjusting a position of a headrest based on a predicted collision. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, although the processes may be implemented in a wide variety of other environments, architectures and systems.

FIG. 5 is an example process 500 for predicting a collision and determining whether to adjust the position of a headrest, such as the headrest 112, the first passenger headrest portion 312(1), and/or the second passenger headrest portion 312(2) based at least in part on the predicted collision. In some instances, some or all of the process 500 may be performed by one or more components in FIG. 4, as described hereinabove. For example, some or all of the process 500 may be performed by the vehicle computing device(s) 404.

At operation 502, the process 500 may include receiving first sensor data captured by one or more first sensor(s) on an autonomous vehicle in an environment. For example, the sensor(s) 406 may capture sensor data associated with an environment through which the vehicle 402 is traveling. In some instances, the first sensor data captured at the operation 502 may be representative of the environment, external to an interior of the vehicle 402. Additionally, or alternatively, the sensor data may be captured by teleoperations, other vehicles, sensors in the environment, and so forth.

At operation 504, the process 500 may include determining that a collision with an object is predicted. For example, the safety system 426 may receive the first sensor data from the sensor(s) 406 and determine that a collision is predicted to occur. In some instances, a determination that the collision is predicted to occur may include detecting an object (e.g., another vehicle, pole, wall, etc.) in the environment, determining that the object has a high closure rate toward the vehicle 402 (e.g., the vehicle 402 sliding toward the object, an object trajectory aimed at side of the vehicle 402, etc.), and/or determining that an object trajectory intersects with a vehicle trajectory. Additionally, or alternatively, whether the collision is predicted collision is to occur may include a determination of whether a collision probability of the collision is greater than a threshold probability. Further, whether the collision is predicted collision is determined to occur may be based at least in part on the predicted collision occurring within a predetermined or threshold time (e.g., 3 seconds, 5 seconds, etc.). In some instances, the threshold time may be a pre-determined amount of time and/or may be based on a speed of the vehicle 402 and/or the object, an acceleration of the vehicle 402 and/or the object, weather, traffic density, and/or other considerations.

At operation 506, the process 500 may include receiving second sensor data captured by one or more second sensor(s) on the autonomous vehicle. For example, the sensor(s) 406 may capture sensor data associated with an interior of the vehicle 402. In some instances, the second sensor data captured at the operation 502 may be from camera(s) (e.g., mounted on a ceiling within the vehicle 402, mounted on the headrest, etc.), distance sensor(s) (e.g., mounted on the headrest), and/or other sensor(s) within the interior of the vehicle 402. In some instances, and as discussed in detail herein, the second sensor data may be used to determine a position of occupant(s) within the vehicle and/or position of the headrest 112 relative to the head of the occupant, vice versa.

At operation 508, the process 500 may include determining whether the occupant is rearward facing. For example, based at least in part on the second sensor data, the safety system 426 may determine whether occupant(s) in the vehicle 402 are rearward facing, relative to a direction of travel of the vehicle 402. In some instances, the second sensor data may represent image data that is analyzed to determine the presence of rearward facing occupant(s) in the vehicle 402, the second sensor data may be generated by a contact sensor of a seatbelt system of the vehicle 402 (e.g., determine rearward facing occupants based on seatbelts used), and/or the second sensor data may be generated from a weight sensor in the seat (e.g., detect presence of the occupant(s)). In some instances, the safety system 426 may determine whether the occupant(s) are rearward facing given the danger (e.g., whiplash, hyperextension, etc.) posed to rearward facing occupant(s) in the event of a collision. At 508, if the process 500 determines that there are no rearward facing occupant(s), the process 500 may follow the "NO" route and proceed to 510.

At operation 510, the process 500 may include deploying other safety system(s). For example, the vehicle 402 may perform a safe maneuver to avoid the collision (e.g., stop, swerve, etc.), active airbag(s), restraint system(s), and so forth In some instances, the vehicle computing device(s) 404, the safety system 426, and/or the computing device(s) 432 may cause the other safety system(s) to deploy and/or activate. Additionally, or alternatively, a teleoperations system, for example, as discussed in U.S. Pat. No. 10,386,836 titled "Interactions Between Vehicle and Teleoperations System" and issued Aug. 20, 2019, which is incorporated by reference herein in its entirety, may be in communication with the vehicle 402 and deploy the other safety system(s).

Alternatively, if at operation 508, the process 500 determines that there are rearward facing occupant(s), the process 500 may follow the "YES" route and proceed to 512.

At operation 512, the process 500 may include determining a vertical position, horizontal position, and/or orientation of a headrest of the vehicle relative to an occupant's head. For example, the safety system 426 may determine whether the headrest is positioned above or below the head of the occupant, how far the headrest is positioned from the back of the head of the occupant, and/or an orientation of the headrest. In some instances, the safety system 426 may determine the position the headrest based on the second sensor data captured by the one or more second sensor(s), sensor(s) within the headrest (e.g., distance sensor, proximity sensor, etc.), and/or sensor(s) within the interior of the vehicle 402 (e.g., camera(s)). For example, a camera disposed with the interior of the vehicle 402 may be used to detect a position of the head of the occupant and/or a position of the headrest.

In some instances, the distance sensor of the headrest may output a signal in a direction towards the head of the occupant, whereby the signal may reflect off the head (or other object(s) within the interior of the vehicle) and the sensor may capture the reflected signal. Based on the reflected signal, the sensor or the safety system 426 may determine the vertical position, the horizontal position, and/or an orientation of the headrest relative to the occupant's head. For example, in some instances, if the sensor is positioned on a top surface of the headrest, the signal output by the sensor may reflect off the head. In such instances, the reflected signal captured by the sensor may indicate that the headrest is too low. Comparatively, if the signal does not reflect off the head of the occupant, but other objects in the vehicle 402, this may indicate that the headrest is too high (or above the top of the head of the occupant). In other words, the reflected signal may indicate a distance between the sensor (or the headrest) and a detected object. If this detected object is detected within a distance threshold (e.g., 10 cm) of the sensor (or the headrest), the object may correspond to the head of the occupant. Alternatively, if the detected object is not within the distance threshold, the object may not correspond to the head of the object. Such indications may therefore be used to determine whether the headrest is above the occupant, below the occupant, or any position relative to the occupant. Moreover, the horizontal position may represent a distance between a central position of the headrest and a back of the head (e.g., as determine by the reflected signal). Additionally, or alternatively, the horizontal position may represent a distance between a front surface of the headrest (e.g., facing the occupant) and the back of the head.

At 514, the process 500 may include determining whether the vertical position, the horizontal position, and/or the orientation of the headrest is/are within threshold(s). In such instances, the threshold(s) may be associated with a vertical threshold, a horizontal threshold, and an orientation threshold, respectively. For example, to safely protect the occupant against whiplash or hyperextension, the top of the headrest may be substantially aligned with the top of the head of the occupant or the center of the headrest may be substantially aligned with the center of the head of the occupant. In some instances, as part of this, the process 500 may determine a vertical center of the headrest and a vertical center of the head of the occupant. In some instances, the threshold vertical position may correspond to instances where a vertical center of the headrest is disposed at a height at least equal to a height of a vertical center of the head of the occupant, or between zero (0) and 10 cm above the vertical center of the head of the occupant. Additionally, or alternatively, the vertical center of the headrest may be disposed at a height at least equal to a height of a vertical center of the head of the occupant, or between zero (0) cm and 5 cm above a top of the head of the occupant. However, although the above discussion is with regard to positioning the headrest using the center of the headrest and the center of the head of the occupant, or relative to the center of the head of the occupant, other relations are envisioned. For example, the top of the headrest may be positioned relative to a top of the head of the occupant, or the center of the headrest may be positioned relative to the top of the head of the occupant.

The threshold horizontal position may be such that when the horizontal distance within a threshold distance (e.g., range), the headrest may be properly horizontally positioned. For example, when a front surface of the headrest and the back of the head of the occupant is between zero (0) cm and 5 cm, the headrest may be properly horizontally positioned. In some instances, the horizontal distance may be determined using known dimensions of the headrest and/or known distances between the sensor and the center.

In some instances, the headrest may contact the back of the head to limit whiplash in the event of a collision. By contacting the head of the occupant sooner during a collision, the headrest may have a greater distance over which to absorb energy of the collision, thereby reducing forces applied to the head and neck of the occupant.

The threshold orientation of the headrest may between zero (0) degrees and 20 degrees relative to a vertical axis of the headrest. That is, if the headrest is titled between zero (0) degrees and 20 degrees relative to the vertical axis, the headrest may be properly oriented.

In some instances, the center of the head may be determined using the sensor(s) within the vehicle 402 and/or other sensor(s) positioned or disposed on the headrest. For example, a sensor may be integrated within the headrest and may image the head of the occupant. The image(s) and/or data may be analyzed to determine a volume or area occupied by the head of the occupant, which may be used to determine the center along one or more axes or planes. As another example, camera(s) within the vehicle 402 may additionally or alternatively image the head of the occupant for use in determining the center of the head of the occupant.

At 514, if the process 500 determines that the vertical position, the horizontal position, and/or the orientation is/are within the position and/or orientation threshold(s), the process 500 may follow the "YES" route and proceed to 510. Alternatively, if the process 500 determines that the vertical position, the horizontal position, and/or the orientation is/are not within the position and/or orientation thresholds, the process 500 may follow the "NO" route and proceed to 516.

At 516, the process 500 may include adjusting the vertical position, the horizontal position, and/or the orientation of the headrest. For example, based on the determination that the vertical position of the headrest is either too low or too high, the safety system 426 may instruct or control the headrest actuator(s) 446 to either raise or lower the headrest. By way of example, if the headrest is too low on the head of the occupant, the safety system 426 may cause the headrest actuator(s) 446 to raise the headrest upwards. Additionally, in instances where the horizontal position of the headrest is too far away from the occupant, the safety system 426 may instruct the headrest actuator(s) 446 to extend the headrest towards the head of the occupant. Additionally, the headrest actuator(s) 446 may rotate the headrest to slightly tilt downwards towards the head of the occupant. In some instances, the headrest actuator(s) 446 may rotate the headrest between up to 20 degrees relative to a vertical plane.

In some instances, headrest may be adjusted vertically, horizontally, and/or rotationally simultaneously, or the adjustments may be performed sequentially (e.g., vertical adjustment, followed by rotational adjustment, followed by horizontal adjustment). Also, while the vertical, horizontal, and rotational adjustments are described as separate adjustments, in some examples an actuator may be configured such that motion of the headrest includes both vertical, horizontal, and/or rotational components of motion.

In some instances, the process 500 may determine how to adjust the headrest based at least in part on a time associated with the predicted collision. For example, positioning the headrest may take different amounts of time depending on the type of actuator. If the collision is predicted to occur under a threshold amount of time, or has already occurred, the process 500 may utilize pyrotechnics to adjust the headrest. Comparatively, if the collision is predicted to occur over the threshold amount of time, the process 500 may utilize linear actuator(s) to adjust the headrest, for example. In such instances, the use of pyrotechnics may more quickly deploy or adjust the position of the headrest. Additionally, the use of the linear actuators to adjust the headrest may be a reversable action, whereas if pyrotechnics are used, the vehicle may need to be serviced to recharge or replace the pyrotechnic actuators.

From operation 516, the process 500 may loop to 512, whereby the process 500 may determine the vertical position, the horizontal position, and/or the orientation of the headrest of the vehicle relative to an occupant's head. As such, the sensor may iteratively determine the vertical position, the horizontal position, and/or the orientation of the headrest for use in whether to vertically adjust headrest, horizontally adjust the headrest, and/or rotate the headrest. For example, if the top of the headrest is positioned below the top of the head of the occupant, the headrest may be incrementally raised until the top of the headrest is aligned, or substantially aligned, with the top of the head of the occupant. That is, the distance sensor (or other sensor(s)) may iteratively emit signals and when the reflected signals are indicative of the headrest being positioned above the head of the occupant (e.g., object(s) are not detected within a threshold distance) or aligned with the top of the head, the headrest may be said to be aligned, or substantially aligned, with the top of the head of the occupant. In such instances, the vertical center of the headrest may be aligned, or substantially aligned, with the vertical center of the head of the occupant. However, in some instances, when the process 500 detects that the headrest is aligned, or substantially aligned, with the top of the head of the occupant, the headrest actuator(s) 446 may further raise the headrest between zero (0) cm and 10 cm. Similar iterations may also be performed for determining and adjusting the horizontal and/or rotational positions. In some instances, the process 500, from 516, may proceed to 510

Although the process 500 is discussed with regard to adjusting a single headrest for a single occupant, it is to be understood that the process 500 may be performed sequentially or in parallel for additional occupant(s) in the vehicle 402. For example, the vehicle may include multiple seating positions (e.g., seats, benches, etc.) and the position and/or orientation a headrest at each seating position may be independently adjusted based on a size and position of an occupant occupying the respective seating position. Thus, each headrest may be adjusted on a per-occupant basis based on sensor data indicating a position of each occupant relative to a respective headrest.

FIG. 6 is an example process 600 for predicting a collision and determining whether to adjust a position of a headrest, such as the headrest 112, the first passenger headrest portion 312(1), and/or the second passenger headrest portion 312(2) based at least in part on the predicted collision. In some instances, some or all of the process 600 may be performed by one or more components in FIG. 4, as described hereinabove. For example, some or all of the process 600 may be performed by the vehicle computing device(s) 404.

At 602, the process 600 may include determining, at a first instance, a safe position of a headrest for an occupant of a vehicle in event of a predicted collision. For example, upon entering a vehicle 402, the occupant may be instructed to sit upright in a seat (or seating area) of the vehicle 402. To assist the occupant, in some instances, an interface or display within the vehicle 402 may request that the occupant sit in an upright position for determining the safe position. Additionally or alternatively, the display may output content illustrating a proper safe seating position within the vehicle 402, which may assist the occupant as to a proper seating position and allow for the vehicle to determine the safe position. In some instances, the safe position of the headrest may be determined prior to movement of the vehicle 402 such that, in response to a determination of a predicted collision, the headrest may be positioned according to the safe position. By way of example, in some instances, the safe position of the headrest may be aligned, or substantially aligned, with a vertical center of the headrest with a vertical center of the head of the occupant. Additionally, or alternatively, the vertical center of the headrest may be positioned between zero (0) cm and 10 cm above the vertical center of the occupant's head. However, rather than being relative to the vertical center, the top of the headrest may be aligned, or substantially aligned, with a top of the head of the occupant.

In some instances, the safe position of the headrest may be determined based on sensor data captured by one or more sensor(s) of the headrest and/or within an interior of the vehicle 402 (e.g., camera). Additionally, or alternatively, a profile associated with the occupant may be accessed for determining a height of the occupant and/or other occupant characteristic(s). In some instances, these characteristic(s) may be utilized for determining the safe position of the headrest. For example, the headrest position may be determined via a known height of the occupant. Previously utilized headrest positions of the occupant may also be utilized. In some instances, the safe position of the headrest may be represented by a vertical position and/or horizontal position. Moreover, in some instances, the safe position of the headrest may be determined using a position of the headrest actuator(s) 446 (e.g., an extended length of the headrest actuator(s) 446) once the headrest is positioned in the safe position. Such locations, or extensions, may be recorded for use at later instances. Additionally, the safe position may be updated continuously or periodically during the ride in the event the user materially changes position (slouches, leans forward, etc.).

At operation 604, the process 600 may include receiving sensor data captured by one or more sensor(s) on an autonomous vehicle in an environment. For example, the sensor(s) 406 may capture sensor data associated with an environment through which the vehicle 402 is traveling. In some instances, the sensor data captured at the operation 602 may be representative of the environment, external to an interior of the vehicle 402. However, the sensor data may be captured by other sensor(s) associated with the vehicle 402, sensor(s) associated with other vehicles/objects, and so forth.

At operation 606, the process 600 may include determining, at a second instance, an actual or predicted collision. For example, the safety system 426 may receive the sensor data from the sensor(s) 406 and determine that a collision is predicted is to occur or has occurred. The second instance may be after the first instance. In some instances, a determination that the collision is predicted may include detecting an object (e.g., another vehicle, pole, wall, etc.) in the environment, determining that the object has a high closure rate toward the vehicle 402 (e.g., the vehicle 402 sliding toward the object, an object trajectory aimed at side of the vehicle 402, etc.), and/or determining that an object trajectory intersects with a vehicle trajectory. Additionally, or alternatively, whether the collision is predicted may include a determination of whether a collision probability is greater than a threshold probability. Further, whether the predicted collision is imminent may be based at least in part on the predicted collision occurring within a predetermined or threshold time (e.g., imminent). In some instances, the threshold time may be a pre-determined amount of time and/or may be based on a speed of the vehicle 402 and/or the object, an acceleration of the vehicle 402 and/or the object, weather, traffic density, and/or other considerations. Sensor(s) of the vehicle 402 may also be used to determine whether the collision occurred.

At operation 608, the process 600 may include determining whether the occupant is rearward facing. For example, the safety system 426 may determine whether the occupant in the vehicle 402 is rearward facing, relative to a direction of travel of the vehicle 402. In some instances, the safety system 426 may determine whether the occupant is rearward facing based on a seatbelt system of the vehicle 402, or other sensor(s) (e.g., weight) that detects the presence of the occupant in a seating area of the vehicle 402.

At 608, if the process 600 determines that the occupant is rearward facing, the process 600 may follow the "YES" route and proceed to 610. At 610, the process 600 may determine, at a third instance, a current position of the headrest. In some instances, the current position of the headrest may be determined based on the distance sensor within the headrest, camera(s) within an interior of the vehicle 402, and/or other sensor(s) of the vehicle. The third instance may be after the second instance. After the first instance in which the safe position of the headrest was determined (at operation 602), the occupant may physically or otherwise adjust the headrest to their comfort. In some instances, this adjustment may not correspond to the safe position, or may be different than the safe position. For example, the occupant may lower the headrest for comfort. However, this position may be unsafe in the event of a collision given the risk of hyperextension. In some instances, the current position of the headrest may be represented by a vertical position and/or horizontal position. In some instances, the current position of the headrest may be determined using a current position of the headrest actuator(s) 446 (e.g., an extended length of the headrest actuator(s) 446).

At 612, the process 600 may include determining whether the current position is within threshold(s). For example, the safety system 426 may include determining whether the current position is within a vertical threshold, horizontal threshold, and/or orientation threshold. For example, the safety system 426 may compare the current vertical position of the headrest with that of the vertical position corresponding to the safe position, compare the current horizontal position of the headrest with that of the horizontal position correspond to the safe position, and/or compare the current orientation of the headrest with that of the orientation of the safe position. In some instances, the safe position may be associated with vertical ranges, horizontal ranges, and/or orientation ranges. As such, the current position of the headrest (e.g., vertical, horizontal, orientation) may be compared against respective thresholds for determining whether the current position satisfies threshold(s) (e.g., vertical threshold, horizontal threshold, orientation threshold).

If at operation 612, the process 600 determines that the current position is not within the threshold(s), the process 600 may follow the "YES" route and proceed to 614. At 614, the process 600 may include adjusting a position of the headrest. For example, the safety system 426 may instruct or control the headrest actuator(s) 446 to actuate and adjust the headrest. In some instances, adjusting the headrest may include a vertical adjustment, a horizontal adjustment, and/ or a rotational adjustment of the headrest. Additionally, adjusting the headrest may include adjusting the headrest according to the safe position, or the previously stored safe position. In some instances, this may include a vertical adjustment, a horizontal adjustment, and/or a rotational adjustment.

Moreover, in some instances, the process 600 may determine how to adjust the headrest based at least in part on a time associated with the predicted collision. For example, positioning the headrest may take different amounts of time depending on the type of actuator. If the collision is predicted to occur under a threshold amount of time, or has already occurred, the process 600 may utilize pyrotechnics. Comparatively, if the collision is predicted to occur over the threshold amount of time, the process 600 may utilize linear actuator(s) to adjust the headrest, for example. In such instances, the use of pyrotechnics may more quickly adjust the position of the headrest. Additionally, the use of the linear actuators to adjust the headrest may be a reversable action, whereas if pyrotechnics are used, the vehicle may need to be serviced to recharge or replace the pyrotechnic actuators.

If at operation 608 the process 600 determines that the occupant is not rearward facing, the process 600 may follow the "NO" route and proceed to 616. As also shown, the process 600 may proceed to 616 as a result of "NO" from 612.

At 616, the process 600 may include determining whether are additional occupant(s) within the vehicle. For example, the vehicle may include more than one passenger and the headrest of the passenger(s) each be respectively adjusted. In some instances, the presence or location of the additional passengers may be determined similarly as the operation 616.

If at 616, the process 600 determines that there are additional occupant(s), the process 600 may follow the "YES" route and proceed to 618. At 620, the 618 600 may include adjusting an additional headrest of the vehicle. For example, the safety system 426 may instruct the headrest actuator(s) 446 to vertically adjust to raise and/or lower the headrest, and/or may horizontally adjust and/or rotationally adjust to bring the headrest into contact with the back of the head of the occupant. As such, FIG. 6 and the process 600 illustrates a scenario whereby the vehicle 402 may include multiple seating positions and headrests associated with the seating positions. The position and/or orientation of the headrest at each seating position may be independently adjusted based on a size and position of an occupant occupying the respective seating position. Thus, each headrest may be adjusted on a per-occupant basis and according to the size and position of the occupant, which seat they are in, and how they are positioned relative to the headrest.

Alternatively, if at 616, the process 600 determines that there are no additional occupants, the process 600 may follow the "NO" route and proceed to 620. At 620, the process 600 may include deploying other safety system(s). For example, the vehicle 402 may perform a maneuver to avoid the collision (e.g., stop, swerve, etc.), may deploy airbag(s), may deploy restraint systems, and so forth. In some instances, the vehicle computing device(s) 404 and/or the computing device(s) 432 may cause deployment of the safety system(s).

Although the discussion of the process 600 relates to the safety system 426 instructing the headrest actuator(s) 446 or causing adjustment of the headrest, the vehicle 402 may include one or more additional, or redundant, systems and/or sensor(s) to ensure the safety of the occupant(s) of the vehicle 402 and/or the object, as well as the environment. For example, the headrest may include components (e.g., similar to those discussed above with regard to FIG. 2) for instructing actuator(s) or other motors to adjust the position of the headrest. Additionally, in some instances, the headrest actuator(s) may include a hinge or release that gives away or dampens the forces of rebound to prevent neck injury to the forward facing occupant(s). For example, the hinge may deform, bend, or otherwise release force gradually if the force exerted by the head of the occupant(s) exceeds a threshold.

Example Clauses

The following paragraphs describe various examples. Any of the examples in this section may be used with any other of the examples in this section and/or any of the other examples or embodiments described herein.

A: A vehicle system comprising: a seat; a headrest coupled to the seat; an actuator configured to move the headrest relative to the seat; a first sensor; a second sensor; a processor; and non-transitory computer-readable media storing computer-executable instructions that, when executed by the processor, cause the vehicle system to perform operations comprising: receiving first data captured by the first sensor, the first data representing at least a portion of an environment of the vehicle system; detecting, based at least in part on the first data, an object within the environment; determining a probability associated with a collision between the vehicle system and the object, wherein the probability is determined based at least in part on a first trajectory associated with the vehicle system and a second trajectory associated with the object; determining that the probability meets or exceeds a threshold probability; determining that an occupant of the vehicle system is occupying the seat, wherein the occupant is rearward facing relative to a direction of travel of the vehicle system; receiving second data captured by the second sensor, the second data representing a position of the headrest relative to a head of the occupant; and causing, based at least in part on the second data and the probability meeting or exceeding the threshold probability, the actuator to adjust the headrest vertically relative to the head of the occupant.

B: The vehicle system of paragraph A, wherein adjusting the headrest vertically comprises adjusting the headrest so that: a center of the headrest is at or above a center of the head of the occupant; or a top of the headrest is at or above a top of the head of the occupant.

C: The vehicle system of paragraph A or B, the operations further comprising: determining, based at least in part on the second data, a distance between the headrest and the head of the occupant; and causing, based at least in part on distance between the headrest and the head, the actuator or a second actuator to adjust the headrest horizontally toward or away from the head of the occupant.

D: A method comprising: determining that (1) a collision probability associated with a predicted collision between a vehicle in an environment and an object in the environment meets or exceeds a threshold or (2) a collision between the vehicle and the object has occurred; determining a first position of a head of an occupant relative to a headrest within the vehicle; determining, based at least in part on the first position, to adjust the headrest to a second position, the second position being different than the first position; and causing, in response to the collision probability meeting or exceeding the threshold or the collision having occurred, the headrest to adjust to the second position.

E: The method of paragraph D, wherein causing the headrest to adjust to the second position comprises at least one of: causing the headrest to adjust in a horizontal direction relative to the head of the occupant; or causing the headrest to rotate relative to the head of the occupant.

F: The method of paragraph D or E, further comprising determining that the first position does not satisfy a position threshold of the headrest, and wherein: causing the headrest to adjust to the second position is based at least in part on determining that the first position does not satisfy the position threshold, and the second position satisfies the position threshold.

G: The method of any of paragraphs D-F, further comprising: determining a third position of a head of a second occupant relative to a second headrest within the vehicle; determining, based at least in part on the third position, to adjust the second headrest to a fourth position; and causing the second headrest to adjust to the fourth position.

H: The method of any of paragraphs D-G, wherein causing the headrest to adjust to the second position comprises adjusting the headrest so that: a center of the headrest is at or above a center of the head of the occupant; or a top of the headrest is at or above a top of the head of the occupant.

I: The method of any of paragraphs D-H, further comprising receiving sensor data from a sensor within an interior of the vehicle; and determining, based at least in part on the sensor data, the first position.

J: The method of any of paragraphs D-I, wherein the sensor is disposed in or on the headrest.

K: The method of any of paragraphs D-J, further comprising: determining that the occupant is rearward facing relative to a direction of travel of the vehicle; and determining to adjust the headrest to the second position is further based at least in part on determining that the occupant is rearward facing.

L: The method of any of paragraphs D-K, further comprising determining a time associated with the predicted collision, and wherein causing the headrest to adjust is based at least in part on the time associated with the predicted collision such that the headrest is adjusted to the second position prior to occurrence of the predicted collision.

M: The method of any of paragraphs D-L, further comprising determining that, in the first position, a top of the headrest is positioned below a top of the head of the occupant, and wherein causing the headrest to adjust comprises vertically raising the headrest to the second position, wherein in the second position the top of the headrest is positioned at or above the top of the head of the occupant.

N: The method of any of paragraphs D-M, further comprising determining, at a first instance, the second position of the headrest for the occupant, and wherein: determining the collision probability or the collision occurs at a second instance that is after the first instance; and causing the headrest to adjust to the second position occurs at a third instance that is after the second instance.

O: One or more non transitory computer readable media storing instructions executable by a processor, wherein the instructions, when executed, cause the processor to perform operations comprising: determining that (1) a collision probability associated with a predicted collision between a vehicle in an environment and an object in the environment meets or exceeds a threshold or (2) a collision between the vehicle and the object has occurred; determining a first position of a head of an occupant relative to a headrest within the vehicle; determining, based at least in part on the first position, to adjust the headrest to a second position, the second position being different than the first position; and causing, in response to the collision probability meeting or exceeding the threshold or the collision having occurred, the headrest to adjust to the second position.

P: The one or more non-transitory computer-readable media of paragraph O, wherein causing the headrest to adjust to the second position comprises at least one of: causing the headrest to adjust in a horizontal direction relative to the head of the occupant; or causing the headrest to rotate relative to the head of the occupant.

Q: The one or more non-transitory computer-readable media of paragraph O or P, wherein causing the headrest to adjust to the second position comprises adjusting the headrest so that: a center of the headrest is at or above a center of the head of the occupant; or a top of the headrest is at or above a top of the head of the occupant.

R: The one or more non transitory computer readable media of any of paragraphs O-Q, the operations further comprising: receiving sensor data from a sensor within an interior of the vehicle; and determining, based at least in part on the sensor data, at least one of the first position.

S: The one or more non transitory computer readable media of any of paragraphs O-R, the operations further comprising: determining that the occupant is rearward facing relative to a direction of travel of the vehicle; and determining to adjust the headrest to the second position is further based at least in part on determining that the occupant is rearward facing.

T: The one or more non-transitory computer-readable media of any of paragraphs O-S, the operations further comprising determining, at a first instance, the second position of the headrest for the occupant, and wherein: determining the collision probability occurs at a second instance that is after the first instance; and causing the headrest to adjust to the second position occurs at a third instance that is after the second instance.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle system comprising:
  a seat;
  a headrest coupled to the seat;
  an actuator configured to move the headrest relative to the seat;
  a first sensor;
  a second sensor;
  a processor; and
  non-transitory computer-readable media storing computer-executable instructions that, when executed by the processor, cause the vehicle system to perform operations comprising:
    receiving first data captured by the first sensor, the first data representing at least a portion of an environment of the vehicle system;
    detecting, based at least in part on the first data, an object within the environment;
    determining a probability associated with a collision between the vehicle system and the object, wherein the probability is determined based at least in part on a first trajectory associated with the vehicle system and a second trajectory associated with the object;
    determining that the probability meets or exceeds a threshold probability;
    determining that an occupant of the vehicle system is occupying the seat, wherein the occupant is rearward facing relative to a direction of travel of the vehicle system;
    receiving second data captured by the second sensor, the second data representing a position of the headrest relative to a head of the occupant; and
    causing, based at least in part on the second data and the probability meeting or exceeding the threshold probability, the actuator to adjust the headrest vertically relative to the head of the occupant.

2. The vehicle system of claim 1, wherein adjusting the headrest vertically comprises adjusting the headrest so that:
  a center of the headrest is at or above a center of the head of the occupant; or
  a top of the headrest is at or above a top of the head of the occupant.

3. The vehicle system of claim 1, the operations further comprising:
  determining, based at least in part on the second data, a distance between the headrest and the head of the occupant; and
  causing, based at least in part on distance between the headrest and the head, the actuator or a second actuator to adjust the headrest horizontally toward or away from the head of the occupant.

4. A method comprising:
  determining that (1) a collision probability associated with a predicted collision between a vehicle in an environment and an object in the environment meets or exceeds a threshold or (2) a collision between the vehicle and the object has occurred;
  determining a first position of a head of an occupant relative to a headrest within the vehicle;
  determining, based at least in part on the first position, to adjust the headrest to a second position, the second position being different than the first position; and
  causing, in response to the collision probability meeting or exceeding the threshold or the collision having occurred, the headrest to adjust to the second position.

5. The method of claim 4, wherein causing the headrest to adjust to the second position comprises at least one of:
causing the headrest to adjust in a horizontal direction relative to the head of the occupant; or
causing the headrest to rotate relative to the head of the occupant.

6. The method of claim 5, further comprising determining that the first position does not satisfy a position threshold of the headrest, and wherein:
causing the headrest to adjust to the second position is based at least in part on determining that the first position does not satisfy the position threshold, and
the second position satisfies the position threshold.

7. The method of claim 4, further comprising:
determining a third position of a head of a second occupant relative to a second headrest within the vehicle;
determining, based at least in part on the third position, to adjust the second headrest to a fourth position; and
causing the second headrest to adjust to the fourth position.

8. The method of claim 4, wherein causing the headrest to adjust to the second position comprises adjusting the headrest so that:
a center of the headrest is at or above a center of the head of the occupant; or
a top of the headrest is at or above a top of the head of the occupant.

9. The method of claim 4, further comprising:
receiving sensor data from a sensor within an interior of the vehicle; and
determining, based at least in part on the sensor data, the first position.

10. The method of claim 9, wherein the sensor is disposed in or on the headrest.

11. The method of claim 4, further comprising:
determining that the occupant is rearward facing relative to a direction of travel of the vehicle; and
determining to adjust the headrest to the second position is further based at least in part on determining that the occupant is rearward facing.

12. The method of claim 4, further comprising determining a time associated with the predicted collision, and wherein causing the headrest to adjust is based at least in part on the time associated with the predicted collision such that the headrest is adjusted to the second position prior to occurrence of the predicted collision.

13. The method of claim 4, further comprising determining that, in the first position, a top of the headrest is positioned below a top of the head of the occupant, and wherein causing the headrest to adjust comprises vertically raising the headrest to the second position, wherein in the second position the top of the headrest is positioned at or above the top of the head of the occupant.

14. The method of claim 4, further comprising determining, at a first instance, the second position of the headrest for the occupant, and wherein:
determining the collision probability or the collision occurs at a second instance that is after the first instance; and
causing the headrest to adjust to the second position occurs at a third instance that is after the second instance.

15. One or more non-transitory computer-readable media storing instructions executable by a processor, wherein the instructions, when executed, cause the processor to perform operations comprising:
determining that (1) a collision probability associated with a predicted collision between a vehicle in an environment and an object in the environment meets or exceeds a threshold or (2) a collision between the vehicle and the object has occurred;
determining a first position of a head of an occupant relative to a headrest within the vehicle;
determining, based at least in part on the first position, to adjust the headrest to a second position, the second position being different than the first position; and
causing, in response to the collision probability meeting or exceeding the threshold or the collision having occurred, the headrest to adjust to the second position.

16. The one or more non-transitory computer-readable media of claim 15, wherein causing the headrest to adjust to the second position comprises at least one of:
causing the headrest to adjust in a horizontal direction relative to the head of the occupant; or
causing the headrest to rotate relative to the head of the occupant.

17. The one or more non-transitory computer-readable media of claim 15, wherein causing the headrest to adjust to the second position comprises adjusting the headrest so that:
a center of the headrest is at or above a center of the head of the occupant; or
a top of the headrest is at or above a top of the head of the occupant.

18. The one or more non-transitory computer-readable media of claim 15, the operations further comprising:
receiving sensor data from a sensor within an interior of the vehicle; and
determining, based at least in part on the sensor data, at least one of the first position.

19. The one or more non-transitory computer-readable media of claim 15, the operations further comprising:
determining that the occupant is rearward facing relative to a direction of travel of the vehicle; and
determining to adjust the headrest to the second position is further based at least in part on determining that the occupant is rearward facing.

20. The one or more non-transitory computer-readable media of claim 15, the operations further comprising determining, at a first instance, the second position of the headrest for the occupant, and wherein:
determining the collision probability occurs at a second instance that is after the first instance; and
causing the headrest to adjust to the second position occurs at a third instance that is after the second instance.

* * * * *